United States Patent
Watanabe et al.

(12) 
(10) Patent No.: US 8,276,019 B2
(45) Date of Patent: Sep. 25, 2012

(54) PROCESSING METHOD, AND COMPUTER FOR FAULT RECOVERY

(75) Inventors: Satoru Watanabe, Yokohama (JP); Tomohiro Hanai, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 65 days.

(21) Appl. No.: 12/536,601

(22) Filed: Aug. 6, 2009

(65) Prior Publication Data

US 2010/0262862 A1    Oct. 14, 2010

(30) Foreign Application Priority Data

Apr. 10, 2009 (JP) .................... 2009-095632

(51) Int. Cl.
    *G06F 11/00* (2006.01)
(52) U.S. Cl. .......................... 714/20; 714/13
(58) Field of Classification Search .............. 714/10–13, 714/15–20, 4.3, 4.4, 6.3, 6.31
    See application file for complete search history.

(56) References Cited

U.S. PATENT DOCUMENTS

| 4,665,520 A | * | 5/1987 | Strom et al. ................ 714/15 |
| 5,280,611 A | * | 1/1994 | Mohan et al. .......... 707/999.008 |
| 5,864,849 A | * | 1/1999 | Bohannon et al. ........... 707/648 |
| 7,111,139 B2 | * | 9/2006 | Osaki ........................ 711/162 |
| 7,305,421 B2 | * | 12/2007 | Cha et al. ............... 707/999.003 |
| 7,403,959 B2 | | 7/2008 | Nishizawa et al. |

FOREIGN PATENT DOCUMENTS

JP    2006-338432 A    12/2006

OTHER PUBLICATIONS

R. Motwani et al., Query Processing, Resource Management, and Approximation in a Data Stream Management System, Proceedings of the 2003 CIDR Conference.
J. Hwang et al., High-Availability Algorithms for Distributed Stream Processing, ICDE 2005.

* cited by examiner

*Primary Examiner* — Scott Baderman
*Assistant Examiner* — Joseph Kudirka
(74) *Attorney, Agent, or Firm* — Mattingly & Malur, PC

(57) ABSTRACT

A computer for the stream data processing system includes a query recovery point management table. A recovery point management section determines a recovery point for the stream data processing system by identifying an oldest one of input tuples used for generating output tuples, which are managed, or an earlier tuple through the use of a query recovery point stored in the query recovery point management table, and transmits the determined recovery point for the stream data processing system to an additional computer. The additional computer stores the last-received recovery point for the stream data processing system in a checkpoint file. When the computer for the stream data processing system recovers from a fault, the additional computer transmits the data succeeding the stored recovery point to the computer for the stream data processing system.

14 Claims, 32 Drawing Sheets

FIG. 2

REGISTER STRAM STOCK(time_stamp timestamp,price int);

FIG. 3

REGISTER QUERY Q1
    ISTREAM (SELECT MIN(STOCK.price) as minimum,
    MAX(STOCK.price) as maximum FROM STOCK[rows 4]);

FIG. 4

REGISTER QUERY Q2
    ISTREAM (SELECT AVG(Q1.minimum),
    AVG(Q1.maximum) FROM Q1[rows 3]);

FIG. 14

| 1401 | 1402 |
|---|---|
| 10:00:00 | 500 |
| 10:00:01 | 501 |
| 10:00:02 | 502 |
| 10:00:03 | 503 |

C:¥CheckPoint

PROCESSING METHOD, AND COMPUTER FOR FAULT RECOVERY

CLAIM OF PRIORITY

The present application claims priority from Japanese patent application JP 2009-95632 filed on Apr. 10, 2009, the content of which is hereby incorporated by reference into this application.

BACKGROUND OF THE INVENTION

1. Field of the Invention

The present invention relates to a data processing system, and more particularly to a data processing technology for processing stream data in real time.

2. Description of the Related Art

A database management system (hereinafter referred to as the DBMS) has been mainly used for data management of a corporate information system. The DBMS stores processing target data on a disk drive and processes the stored data. Meanwhile, there is an increasing demand for a data processing system that processes momentarily incoming data (tuples) in real time. For example, in a finance application that provides support for stock trading, one of the crucial tasks of the system is to quickly respond to fluctuations in stock prices. If the system stores stock data on a disk drive and then searches through the stored data like a previously used DBMS, the processes for data storage and subsequent searches may fail to keep up with the speed of stock price fluctuations, thereby causing a user of the system to miss important business opportunities.

A stream data processing system is proposed as a data processing system suitable for the above-described real-time data processing. For example, a stream data processing system named "STREAM" is disclosed in Reference 1.

The stream data processing system differs from the previously used DBMS in that the former preregisters a query for defining a data processing method, stores incoming data in a volatile memory of a server, and performs data processing. Stream data processed by the stream data processing system are time-series data such as momentarily changing stock price data, retail POS data, error logs obtained during computer system management, and sensing data generated from sensors, RFID (radio-frequency identification) tags, and the like.

The STREAM processes stream data, which incessantly arrives at the system, while acquiring part of the stream data, for instance, by picking up the last 10 minutes of data or the last 1000 pieces of data. A concept called a window is adopted in order to acquire part of the stream data. A preferred example of a language for describing queries such as a window definition query is Continuous Query Language (hereinafter referred to as CQL) that is disclosed in "Query Processing, Resource Management, and Approximation in a Data Stream Management System" (CIDR 2003) (hereinafter referred to as Reference 1), which is written by R. Motwani, J. Widom, A. Arasu, B. Babcock, S. Babu, M. Datar, G. Manku, C. Olston, J. Rosenstein, and R. Varma.

If the stream data processing system becomes faulty, data stored in the volatile memory of the server may be lost. Therefore, when the stream data processing system recovers from a fault, it is necessary to recover the data stored in the volatile memory as well.

Various fault recovery methods are proposed for use with the stream data processing system. One of them is to reenter an input stream and resume data processing. When this method is used, the input stream is backed up to provide against a system fault. If the system becomes faulty, it is restored to normal by reentering the input stream. Various fault recovery methods for the stream data processing system are disclosed in "High-Availability Algorithms for Distributed Stream Processing" (ICDE 2005) (hereinafter referred to as Reference 2), which is written by Jeong-Hyon Hwang, Magdalena Balazinska, Alexander Rasin, Ugur Cetintemel, Michael Stonebraker, and Stan Zdonik.

Further, a method of enhancing the reliability of stream data processing by archiving stream data in a nonvolatile memory is disclosed in Japanese patent Application Laid-Open Publication No. 2006-338432

BRIEF SUMMARY OF THE INVENTION

When the stream data processing system recovers from a fault, it is preferred that such recovery be achieved without losing output tuples, which are output when no fault occurs.

When a method of reentering an input stream to resume data processing is employed, output tuples may be lost if a small amount of input stream is reentered. To avoid the loss of output tuples, therefore, it is necessary to reenter an adequate amount of input stream. However, no previous disclosures relate to a method of determining the necessary amount of input stream to be reentered to avoid the loss of output tuples.

An object of the present invention is to provide a stream data processing system, a stream data processing method, and a computer that make it possible to avoid the loss of output tuples when the stream data processing system recovers from a fault.

Another object of the present invention is to provide a stream data processing system, a stream data processing method, and a computer that make it possible to determine the amount of input stream to be reentered as needed to avoid the loss of output tuples when an input stream is reentered to resume data processing.

In accomplishing the above objects, according to one aspect of the present invention, there is provided a stream data processing system for processing tuples which are time-stamped stream data, the stream data processing system including a stream data reception section, a query execution section, a stream data transmission section, and a recovery point management section. The stream data reception section receives first tuples. The query execution section performs a data process on the received first tuples to generate second tuples. The stream data transmission section transmits the second tuples, which are generated by the query execution section. The recovery point management section determines a recovery point for the stream data processing system, which is the information identifying the oldest one of the first tuples used for generating the second tuples or identifying an earlier tuple.

In accomplishing the above objects, according to another aspect of the present invention, there is provided a stream data processing system, wherein the query execution section adds tuple recovery point attribute values, which are the information identifying the oldest one of the first tuples used for generating the second tuples or identifying an earlier tuple, to the generated second tuples; and wherein the recovery point management section determines the recovery point for the stream data processing system by conducting a search on all the tuple recovery point attribute values managed by the stream data processing system to locate the oldest recovery point.

Main features of the present invention are summarized below.

The stream data processing system includes the recovery point management section that determines a recovery point for the stream data processing system, which is the information identifying the oldest one of the tuples used for generating tuples managed by the stream data processing system or identifying an earlier tuple.

Further, a tuple recovery point attribute value, which is the information identifying the oldest one of the tuples used for generating tuples or identifying an earlier tuple, is added to the tuples. The recovery point management section determines the recovery point for the stream data processing system by conducting a search on all tuple recovery points to locate the oldest recovery point.

Furthermore, a recovery point attribute value for the query execution section, which is the information identifying a tuple representing the oldest one of the recovery points for tuples to be processed by the query execution section or identifying an earlier tuple, is added to the query execution section. The query execution section sets the above-mentioned recovery point attribute value for the query execution section as a recovery point for second tuples to be generated. The recovery point management section determines the recovery point for the stream data processing system by conducting a search on all recovery points of the query execution section to locate the oldest recovery point.

The present invention provides a stream data processing system that makes it possible to avoid the loss of output tuples and enhance the reliability of data processing.

BRIEF DESCRIPTION OF THE DRAWINGS

FIG. 2 is a diagram illustrating the information to be registered in a stream data processing system;

FIG. 3 is a diagram illustrating the information to be registered in a stream data processing system;

FIG. 4 is a diagram illustrating the information to be registered in a stream data processing system;

FIG. 14 is a diagram exemplifying the contents of a stream backup file in accordance with the first embodiment.

DETAILED DESCRIPTION OF THE PREFERRED EMBODIMENTS

Preferred embodiments of the present invention will now be described with reference to the accompanying drawings. The following description assumes that the various embodiments are a stream data processing system, a stream data processing method, and a computer performing stream data processing. However, it should be noted that the present invention is also an invention of a program that is executed by the aforementioned system, method, and computer. A program executed by an individual computer can be stored in advance in a storage section of the computer, installed on the computer with an input device (not shown) and an appropriate removable storage medium, or downloaded through a network and installed on the computer although such details are not included in the following description. Further, a program is mainly designated as a "section", such as a "query execution section". However, a program can also be designated as a "function" or "means", such as a "query execution function" or "query execution means".

First Embodiment

Figure 1:
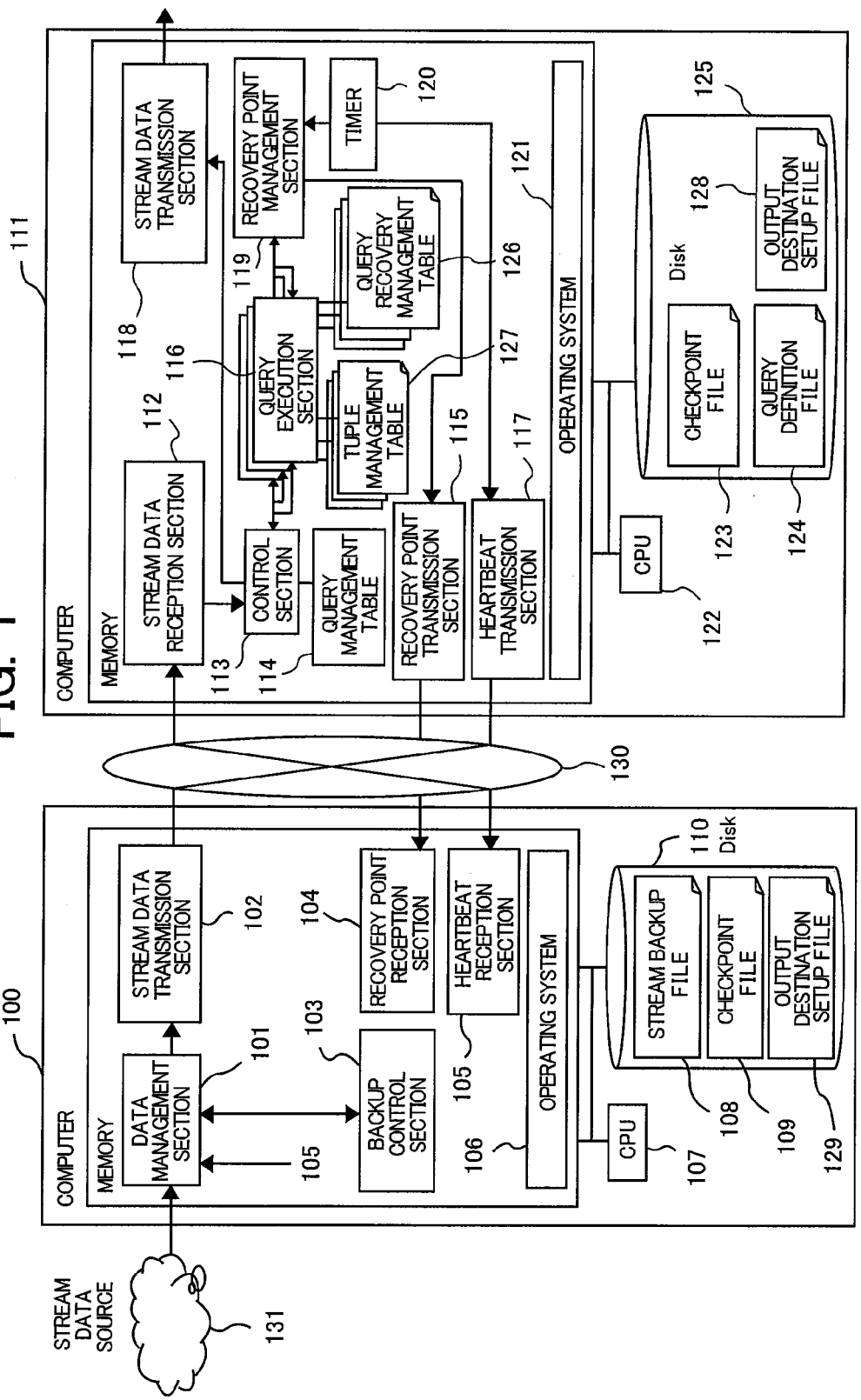
FIG. 1 is a diagram illustrating the configuration of a stream data processing system according to a first embodiment of the present invention.

FIG. 1 is a diagram illustrating a stream data processing system according to a first embodiment of the present invention. The stream data processing system shown in FIG. 1 includes a first computer 100 and a second computer 111. The first computer 100 and the second computer 111 are interconnected through a network 130. A reference numeral 131 denotes a stream data source. A reference numeral 107, which relates to the first computer, and a reference numeral 122, which relates to the second computer, both denote a central processing unit (hereinafter referred to as the CPU), which serves as a processing section. Reference numerals 110 and 125 denote a disk drive (hereinafter referred to as the disk), which serves as a storage section.

Sections 101-105 of the first computer and an operating system 106 are programs that are stored in a memory of the first computer 100 and executed by the CPU 107. As mentioned earlier, these programs can be installed on the computer through a removable storage medium or network. This is also true for all the programs described later.

Sections 112-120 of the second computer and an operating system 121 are programs that are stored in a memory of the second computer 111 and executed by the CPU 122.

Operations performed by the sections 101-105 of the first computer and by the sections 112-120 of the second computer are summarized below.

A data management section 101 is a program that receives time-series data from the stream data source 131 and transmits the time-series data, as tuples, to a backup control section 103 and a stream data transmission section 102. Further, when notified from a heartbeat reception section 105 that the second computer has achieved recovery, the data management section 101 reads the information about the latest recovery point from a checkpoint file 109 and transmits tuples succeeding the recovery point to the stream data transmission section 102. It should be noted that the stream data transmission section 102 may also be referred to as the tuple transmission section.

The backup control section 103 is a program that receives tuples from the data management section 101 and stores them in a stream backup file 108. Further, upon receipt of the information about a recovery point from a recovery point reception section 104, the backup control section 103 deletes tuples preceding the recovery point from the stream backup file 108.

The stream data transmission section 102 is a program that receives tuples from the data management section 101 and transmits the tuples to a stream data reception section 112 of the second computer 111.

The recovery point reception section 104 is a program that receives the information about a recovery point from the recovery point transmission section 115 of the second computer 111, stores the information about the recovery point in the checkpoint file 109, and conveys the information about the recovery point to the backup control section 103.

The heartbeat reception section 105 is a program that receives a communication from a heartbeat transmission section 117. If the heartbeat reception section 105 cannot receive a communication from the heartbeat transmission section 117 for a predetermined period of time, it concludes that the second computer is faulty. If it receives a communication from the heartbeat transmission section 117 after concluding that the second computer is faulty, it concludes that the second computer has achieved recovery, and then notifies the data management section 101 that the second computer has achieved recovery.

The stream data reception section 112 receives tuples from the stream data transmission section 102 and transmits the tuples to a control section 113.

The control section 113 is a program that receives tuples from the stream data reception section 112 or a query execution section 116 and transmits the tuples to the query execution section 116 or a stream data transmission section 118.

The query execution section 116 is a program that receives tuples from the control section 113, performs a query, which is a predefined data processing operation, to generate tuples, and transmits the generated tuples to the control section 113.

A recovery point management section 119 is a program that communicates with the query execution section 116 to determine a recovery point for the stream data processing system.

A timer 120 is a program that gives a notification to the recovery point management section 119 and the heartbeat transmission section 117 at regular time intervals.

The recovery point transmission section 115 is a program that receives the information about a recovery point from the recovery point management section 119 and transmits the information about the recovery point to the recovery point reception section 104.

The heartbeat transmission section 117 is a program that communicates with the heartbeat reception section 105 of the first computer.

The stream data transmission section 118 is a program that receives tuples from the control section 113 and transmits the tuples.

Two computers are used in the configuration shown in FIG. 1. However, an alternative is to operate the sections 101-105 and sections 112-120 with a single computer as described later in connection with another embodiment.

FIGS. 2, 3, and 4 exemplify the contents of a query definition file 124 and a query management table 114 of the second computer. FIG. 2 shows a statement that defines the data format of an input stream. It indicates that the stream data reception section 112 receives an input stream named "STOCK", and that an input stream tuple is composed of a time (time_stamp) and an integer-type price (price).

FIG. 3 shows a statement that defines query Q1. Query Q1 indicates that four tuples of a STOCK stream (STOCK[rows 4]) are used to calculate and output the minimum value of a price (MIN(STOCK.price)) and the maximum value of the price (MAX(STOCK.price)).

FIG. 4 shows a statement that defines query Q2. Query Q2 indicates that three tuples received from query Q1 (Q1[rows 3]) are used to calculate the average value of minimum values (AVG(Q1.minimum)) and the average value of maximum values (AVG(Q1.maximum)).

Figure 5:
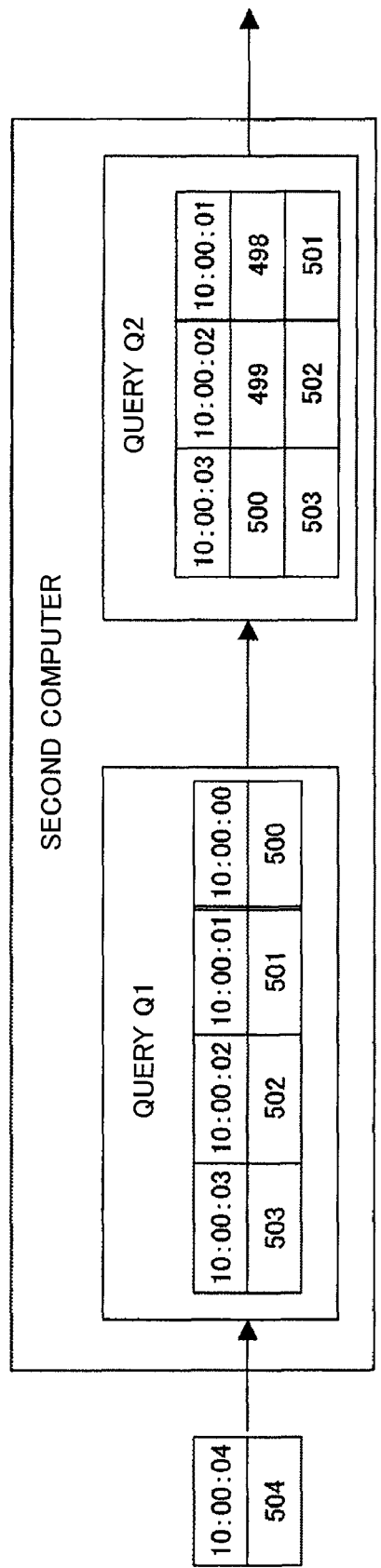
FIG. 5 is a diagram illustrating an operation of a stream data processing system.

Operations of queries Q1 and Q2 will now be described with reference to FIGS. 5, 6, and 7. FIG. 5 shows an example in which a tuple prevailing at a time of 10:00:04 is newly input in a situation where query Q1 manages tuples prevailing between a time of 10:00:00 and a time of 10:00:03 while query 2 manages tuples prevailing between a time of 10:00:01 and a time of 10:00:03. Tuples input into each query may be referred to as input tuples, received tuples, or first tuples, whereas tuples output from each query may be referred to as output tuples, generated tuples, or second tuples. It goes without saying that output tuples generated from query Q1 serve as input tuples for query Q2.

Figure 6:
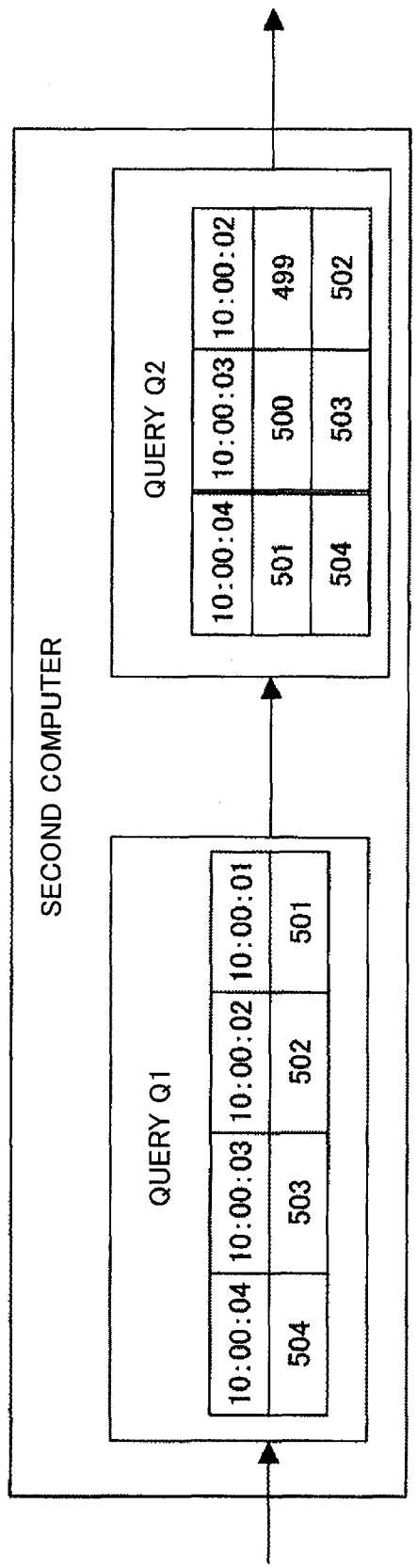
FIG. 6 is a diagram illustrating an operation of a stream data processing system.

As shown in FIG. 6, query Q1 discards a tuple input at 10:00:00, and generates an output tuple describing the minimum value (501) and maximum value (504) of four tuples input between 10:00:01 and 10:00:04.

As shown in FIG. 6, query Q2 receives the tuple generated from query Q1, discards a tuple input at 10:00:01, and manages tuples input between 10:00:02 and 10:00:04.

Figure 7:
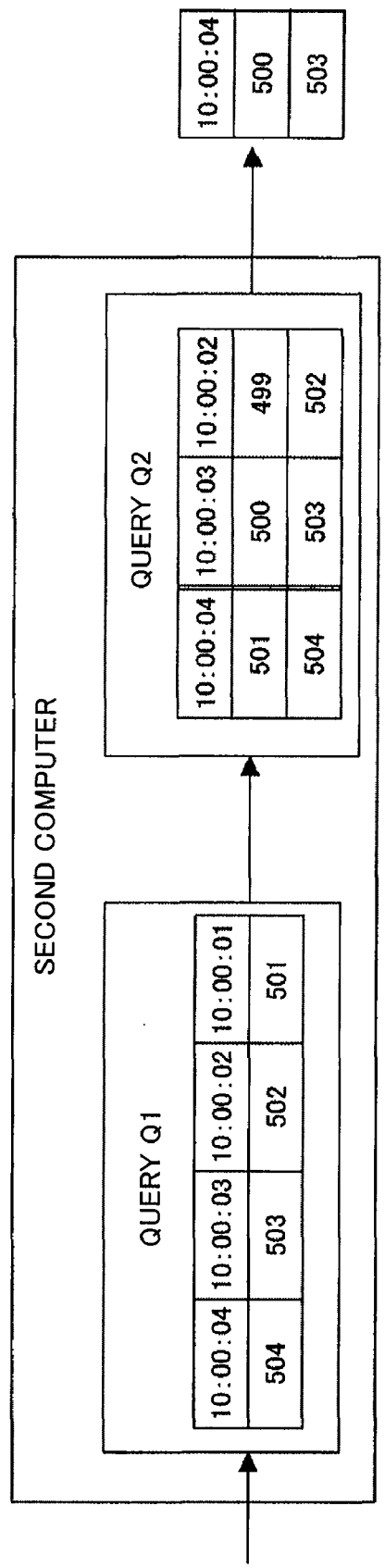
FIG. 7 is a diagram illustrating an operation of a stream data processing system.

Further, as shown in FIG. 7, query Q2 calculates the average value (500) of the minimum values of tuples input between 10:00:02 and 10:00:04 and the average value (503) of the maximum values of the same tuples to generate an output tuple.

Here, there may arise a case where the second computer is down in a situation shown in FIG. 7 so that the information about tuples managed by queries Q1 and Q2 is lost.

If, in the above case, an input stream is reentered from the oldest tuple (the tuple input at 10:00:01) managed by the second computer shown in FIG. 7, the loss of a tuple occurs. The reason is that query Q2 manages a tuple generated at 10:00:03, which is derived from a tuple input at 10:00:00, as indicated in FIG. 7, and that query Q2's tuple at 10:00:03 cannot be recovered if an input stream is reentered from the tuple prevailing at 10:00:01.

As described above, when stream data is processed, a tuple generated, for instance, by a first query is used by a second query. Thus, even if a certain tuple is discarded by the first query, a tuple derived from the discarded tuple remains in the second query. To avoid the loss of output tuples, therefore, it is necessary to reenter an input stream from the oldest one of the tuples used to generate tuples managed by the second computer or from an earlier tuple.

Figure 8:
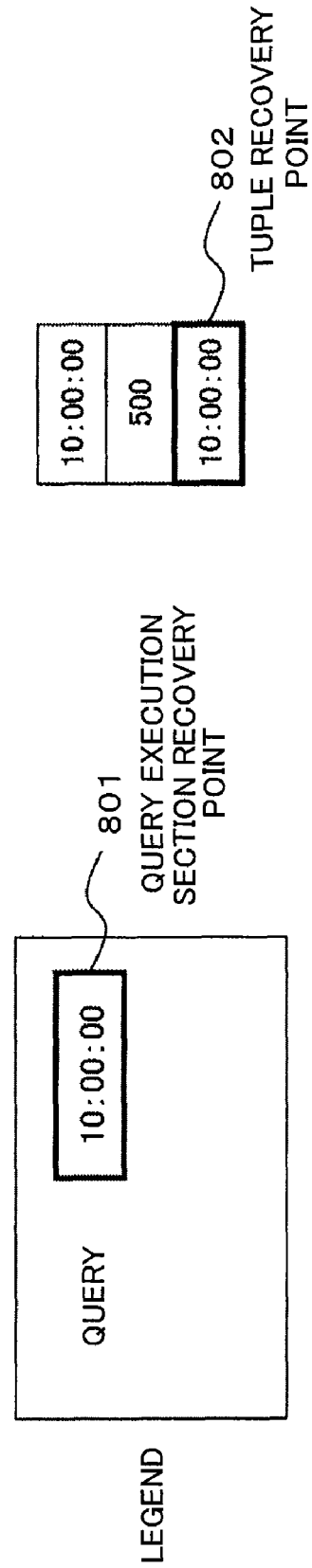
FIG. 8 is a diagram illustrating an operation of the stream data processing system according to the first embodiment.
Figure 9:
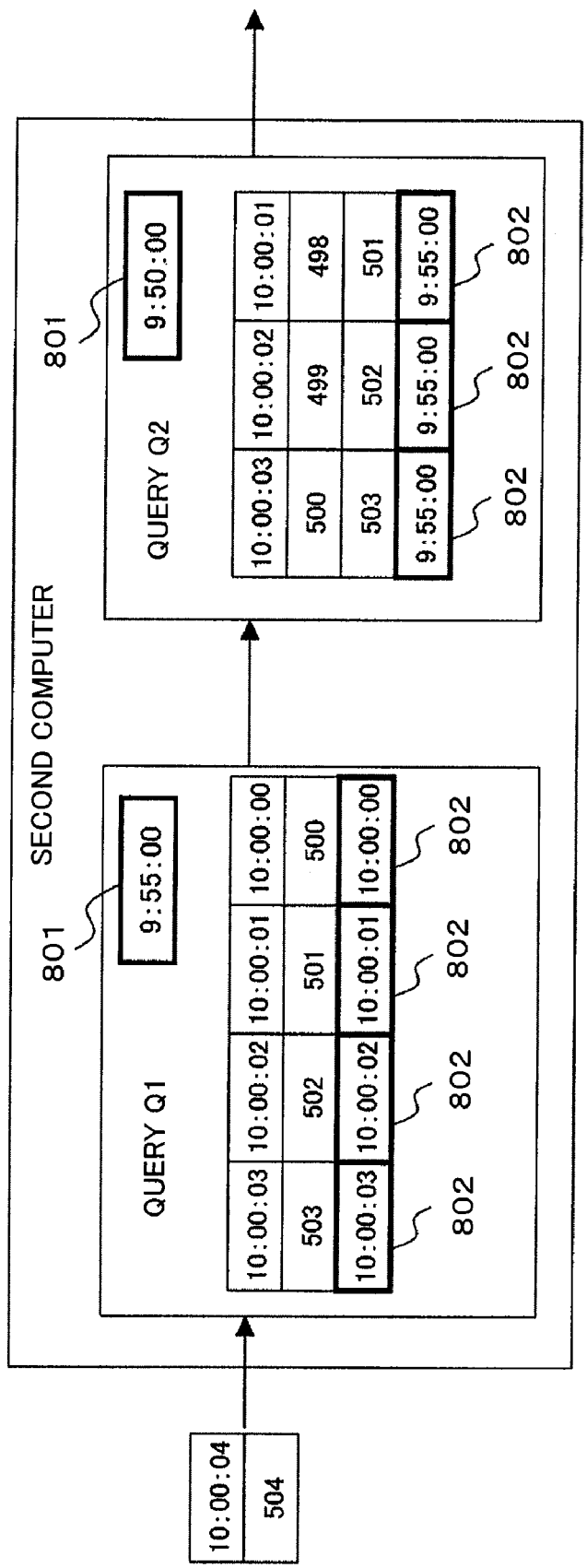
FIG. 9 is a diagram illustrating an operation of the stream data processing system according to the first embodiment.
Figure 10:
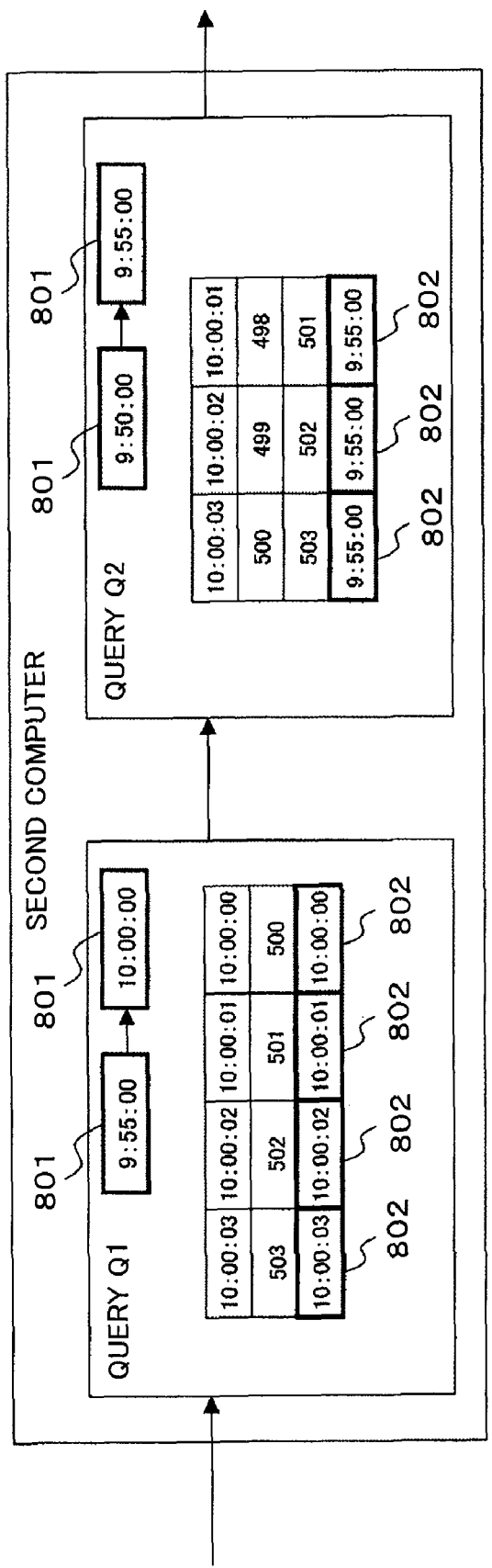
FIG. 10 is a diagram illustrating an operation of the stream data processing system according to the first embodiment.

The first embodiment will now be summarized with reference to FIGS. 8, 9, and 10. In the present embodiment, the attribute of a recovery point 801 for the query execution section 116 is given to the query execution section 116. Further, the attribute of a tuple recovery point 802 is given to each tuple. The recovery point 801 for the query execution section is the information identifying a tuple representing the oldest one of the recovery points for tuples to be processed by the query execution section or identifying an earlier tuple. The recovery point for an output tuple is the information identifying the oldest one of the input tuples used to generate the output tuple or identifying an earlier tuple.

FIG. 8 shows a legend for queries used in FIGS. 9 and 10. As shown in FIG. 8, the attribute value of the recovery point 801 for the query execution section is indicated at the upper right corner of a rectangle representing a query. Further, the attribute value of the tuple recovery point 802 is indicated at the bottom of the rectangle representing a query.

In the present embodiment, the query execution section 116 sets the recovery point 801 for the query execution section as the recovery point 802 for tuples to be generated. In an example shown in FIG. 9, the recovery point 801 (9:55:00) for query Q1 is set as the recovery points 802 for tuples managed by query Q2.

The query execution section 116 periodically updates the recovery point 801 for the query execution section. Referring to FIG. 10, query Q1 has updated the recovery point for the query execution section from 9:55:00 to 10:00:00. This is accomplished by searching the recovery points 802 for all tuples managed by query Q1 and setting the oldest value as the updated value. Further, query Q2 has updated the recovery point 801 for the query execution section from 9:50:00 to 9:55:00. This is accomplished by searching the recovery points 802 for the tuples managed by query Q2 and setting the oldest value as the updated value.

In the present embodiment, the oldest one of the recovery points 801 for the query execution section is used as a recovery point for the stream data processing system. In the example shown in FIG. 10, the recovery point 801 for query Q2 that represents 9:55:00 becomes the recovery point for the stream data processing system.

The above recovery point is the information identifying the oldest one of the tuples used for generating tuples managed by the stream data processing system or identifying an earlier tuple. When an input stream is reentered from this recovery point, the stream data processing system can achieve recovery without losing output tuples.

As described above, the present embodiment periodically updates various recovery points. When such a periodical update is performed, tuples identified by the tuple recovery point 802, query execution section recovery point 801, and stream data processing system recovery point are limited to tuples that succeed the tuple identified by the last determined recovery point for the stream data processing system.

More specifically, the recovery point 802 for a tuple is the information identifying the oldest one of the tuples used for generating the tuple or identifying an earlier tuple; however, it is the information identifying a tuple that is newer than the tuple identified by the last determined recovery point for the stream data processing system. Further, the recovery point 801 for the query execution section is the information identifying the oldest one of the tuples representing the recovery points for tuples to be processed by the query execution section or identifying an earlier tuple; however, it is the information identifying a tuple that is newer than the tuple identified by the last determined recovery point for the stream data processing system. Furthermore, the recovery point for the stream data processing system is the information identifying the oldest one of the tuples used for generating tuples managed by the stream data processing system or identifying an earlier tuple; however, it is the information identifying a tuple that is newer than the tuple identified by the last determined recovery point for the stream data processing system.

Figure 11:
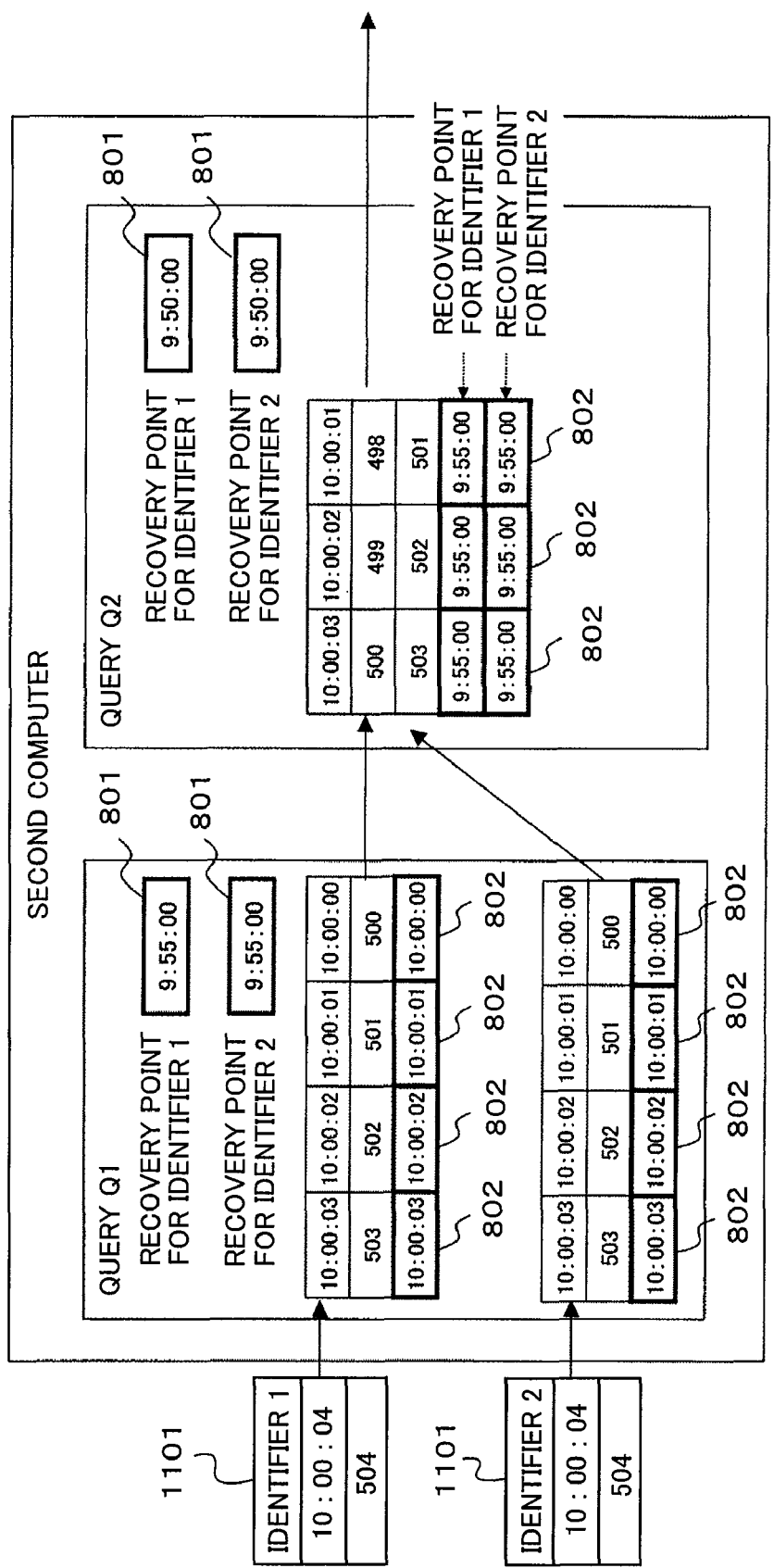
FIG. 11 is a diagram illustrating an operation of the stream data processing system according to the first embodiment.

As shown in FIG. 11, the stream data processing system can process plural pieces of stream data with a stream data identifier 1101 assigned to an input tuple. In this instance, the query execution section recovery point 801, tuple recovery point 802, and stream data processing system recovery point are managed on an individual stream data identifier basis.

When, for instance, stream data with identifier 1 and stream data with identifier 2 are to be processed, a query execution section recovery point 801 for identifier 1 and a query execution section recovery point 801 for identifier 2 are given to the query execution section 116. Further, a tuple recovery point 802 for identifier 1 and a tuple recovery point 802 for identifier 2 are given to a tuple. Then, the recovery point for identifier 1 of the stream data processing system and the recovery point for identifier 2 of the stream data processing system are managed.

Even when plural pieces of stream data are input, recovery point management is exercised in the same manner as when a single piece of stream data is input. Therefore, the operation of the present embodiment will now be described with reference to the accompanying drawings, on the assumption that a single piece of stream data is input.

Figure 12:
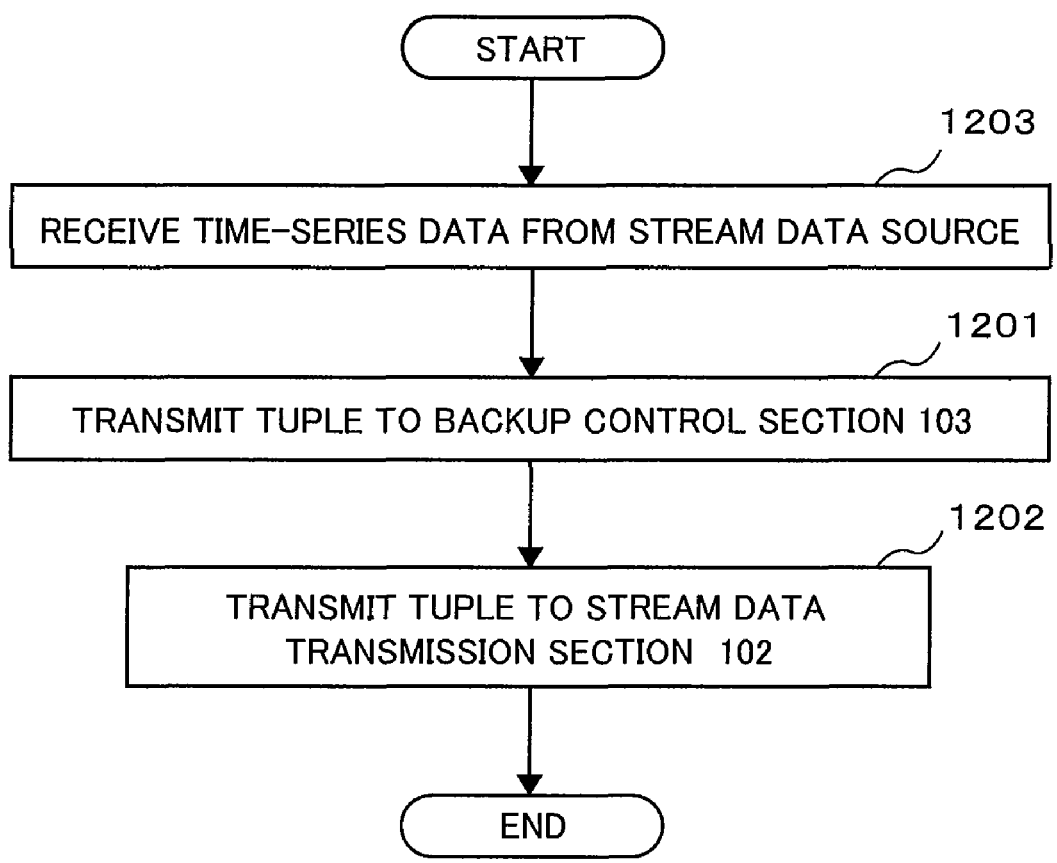
FIG. 12 is a flowchart illustrating an operation of a data management section in accordance with the first embodiment.

FIG. 12 is a flowchart illustrating an operation of the data management section 101, which is one of the programs executed by the CPU 107 of the first computer 100 shown in FIG. 1. Upon receipt of data from the stream data source 131, the data management section 101 starts operating. The stream data source 131 is a computer for stockbroking or a computer for managing retail POS data. The data management section 101 receives time-series data, such as stock price data or product sales data, from the stream data source 131 (step 1203). Upon receipt of the time-series data from the stream data source 131, the data management section 101 functions (steps 1201 and 1202) to transmit the time-series data as a tuple to the backup control section 103 and to the stream data transmission section 102.

Figure 13:
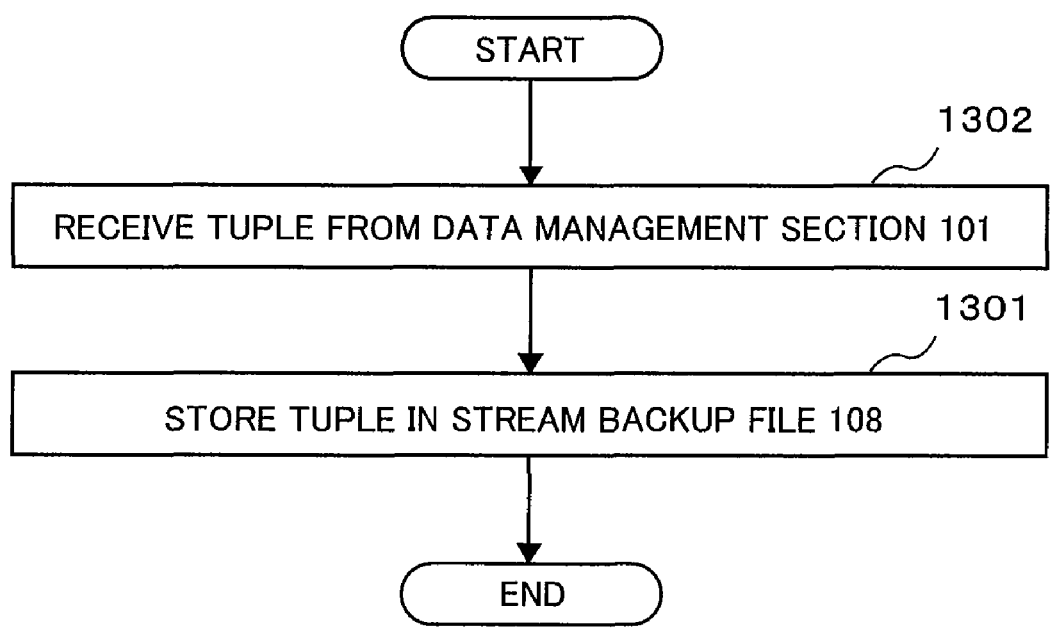
FIG. 13 is a flowchart illustrating an operation of a backup control section in accordance with the first embodiment.

FIG. 13 is a flowchart illustrating an operation of the backup control section 103. Upon receipt of a tuple from the data management section 101 (step 1302), the backup control section 103 starts operating. The backup control section 103 stores the received tuple in the stream backup file 108 (step 1301). FIG. 14 shows exemplary tuples stored in the stream backup file 108. As shown in FIG. 14, the stream backup file 108 stores time 1401 and data 1402 in chronological order.

The stream data transmission section 102 receives a tuple from the data management section 101 and transmits the tuple to the stream data reception section 112. The stream data reception section 112 of the second computer 111 transmits the received data to the control section 113.

Figure 15:
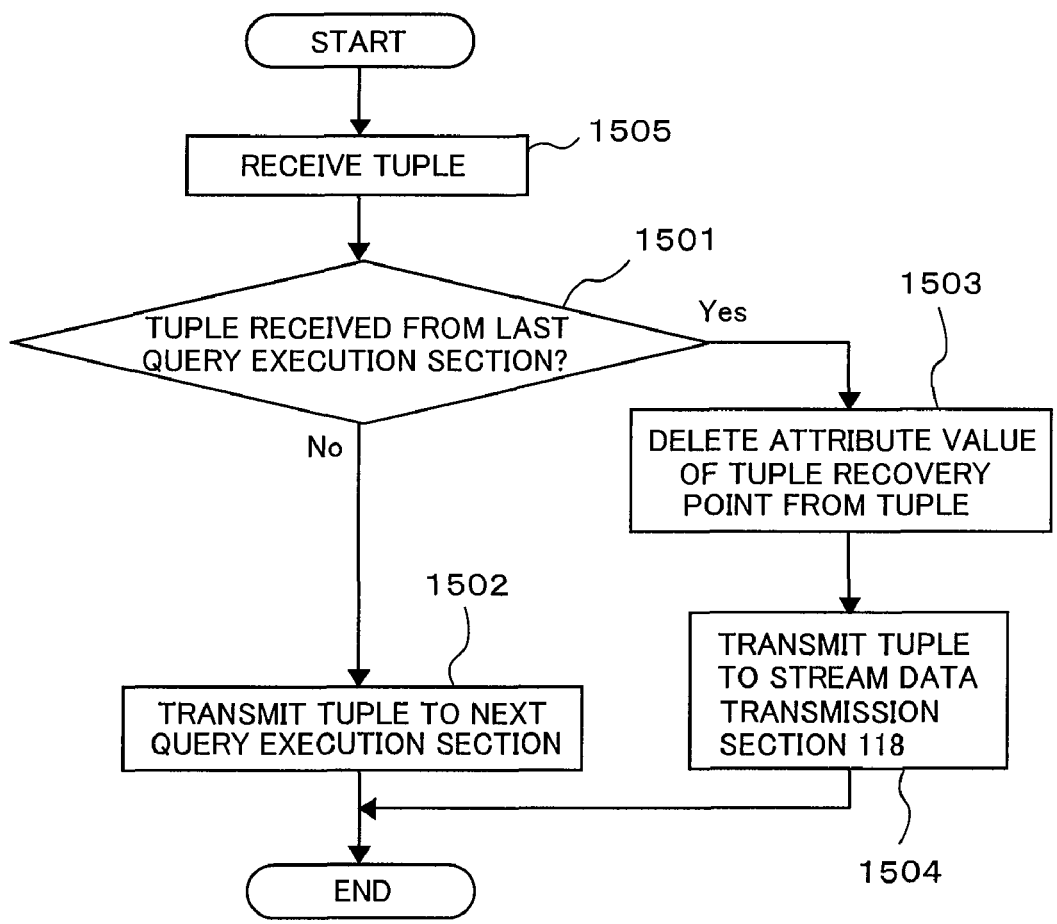
FIG. 15 is a flowchart illustrating an operation of a control section in accordance with the first embodiment.

FIG. 15 is a flowchart illustrating an operation of the control section 113 of the second computer 111. Upon receipt of a tuple from the stream data reception section 112 or a query execution section 116 (step 1505), the control section 113, which is a program executed by the CPU 122, starts operating. The control section 113 then judges whether a tuple is received from the last query execution section 116 (step 1501). The order relation among queries (queries Q1, Q2, . . . ) is defined as shown in FIGS. 3 and 4. The control section 113 references the query management table 114 to identify the last query execution section 116.

If the result of the judgment in step 1501 is NO, step 1502 is performed to transmit a tuple to the next query execution section 116. In step 1502, too, the control section 113 references the query management table 114 to identify the order relation among the queries.

If the result of the judgment in step 1501 is YES, step 1503 is performed to delete the attribute of a tuple recovery point given to the tuple. Then, step 1504 is performed to transmit the tuple to the stream data transmission section 118.

Figure 16:
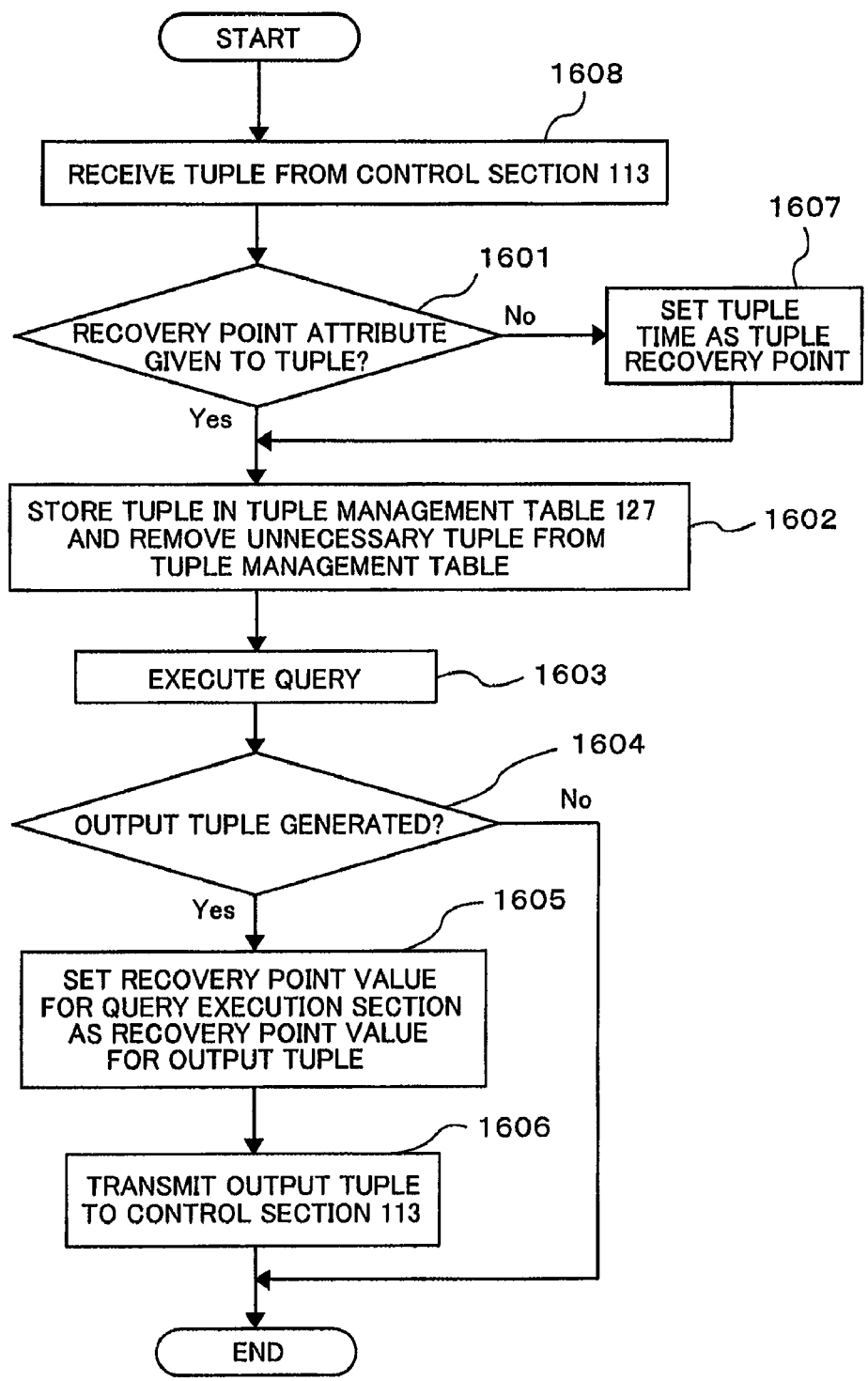
FIG. 16 is a flowchart illustrating an operation of a query execution section in accordance with the first embodiment.

FIG. 16 is a flowchart illustrating an operation of the query execution section 116. There is a query execution section 116 for each defined query. As described earlier, each query is defined so that it is to be executed by a predetermined query execution section 116.

Upon receipt of an input tuple from the control section 113, the query execution section 116 starts operating (step 1608). The query execution section 116 then judges whether a recovery point attribute is given to the received tuple (step 1601). If the result of the judgment in step 1601 is NO, step 1607 is performed to set a tuple time as a tuple recovery point. Step 1602 is then performed to store the received tuple in a tuple management table 127 and remove an unnecessary tuple from the tuple management table 127.

Figure 17:
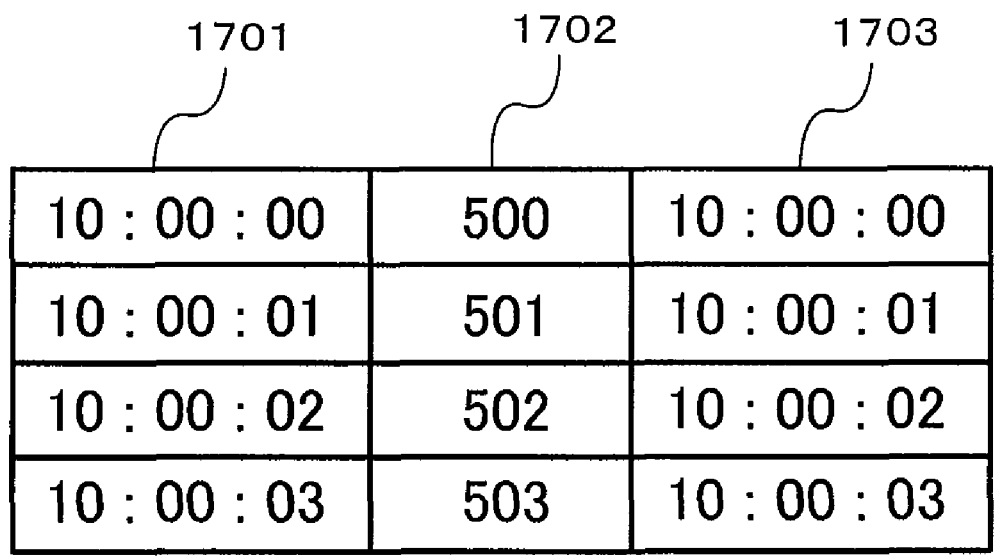
FIG. 17 is a diagram exemplifying the contents of a tuple management table in accordance with the first embodiment.

FIG. 17 shows exemplary tuples stored in the tuple management table 127. The tuple management table 127 stores a tuple time 1701, tuple data 1702, and a tuple recovery point 1703.

It is now assumed for illustrative purposes that the query to be executed by the query execution section 116 is to calculate the minimum and maximum values of four tuples shown in FIG. 3. If, in this instance, a 10:00:04 tuple is received, the 10:00:00 tuple is no longer needed. Therefore, the query execution section 116 discards the 10:00:00 tuple and newly adds the 10:00:04 tuple to the tuple management table 127 as described above.

Next, step 1603 is performed to execute the query. For example, a process for calculating the minimum and maximum values of four tuples or a process for averaging the minimum and maximum values of three tuples is assigned beforehand to each unit of the query execution section 116. In this step, therefore, each unit of the query execution section 116 executes the query to complete such an assignment.

Figure 18:
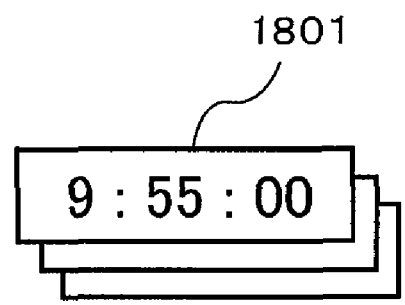
FIG. 18 is a diagram exemplifying the contents of a query recovery point management table in accordance with the first embodiment.

Next, step 1604 is performed to judge whether an output tuple is generated as a result of query execution. If the result of the judgment in step 1604 is YES, step 1605 is performed to set the recovery point value for the query execution section 116 as the recovery point value for the output tuple. The recovery point for the query execution section is described in a query recovery point management table 126. FIG. 18 is a diagram exemplifying the contents of the query recovery point management table 126. The query recovery point management table 126 stores a recovery point 1801 for each involved unit of the query execution section 116. In step 1606, the query execution section 116 transmits the output tuple, which is generated as a result of query execution, to the control section 113.

Figure 19:
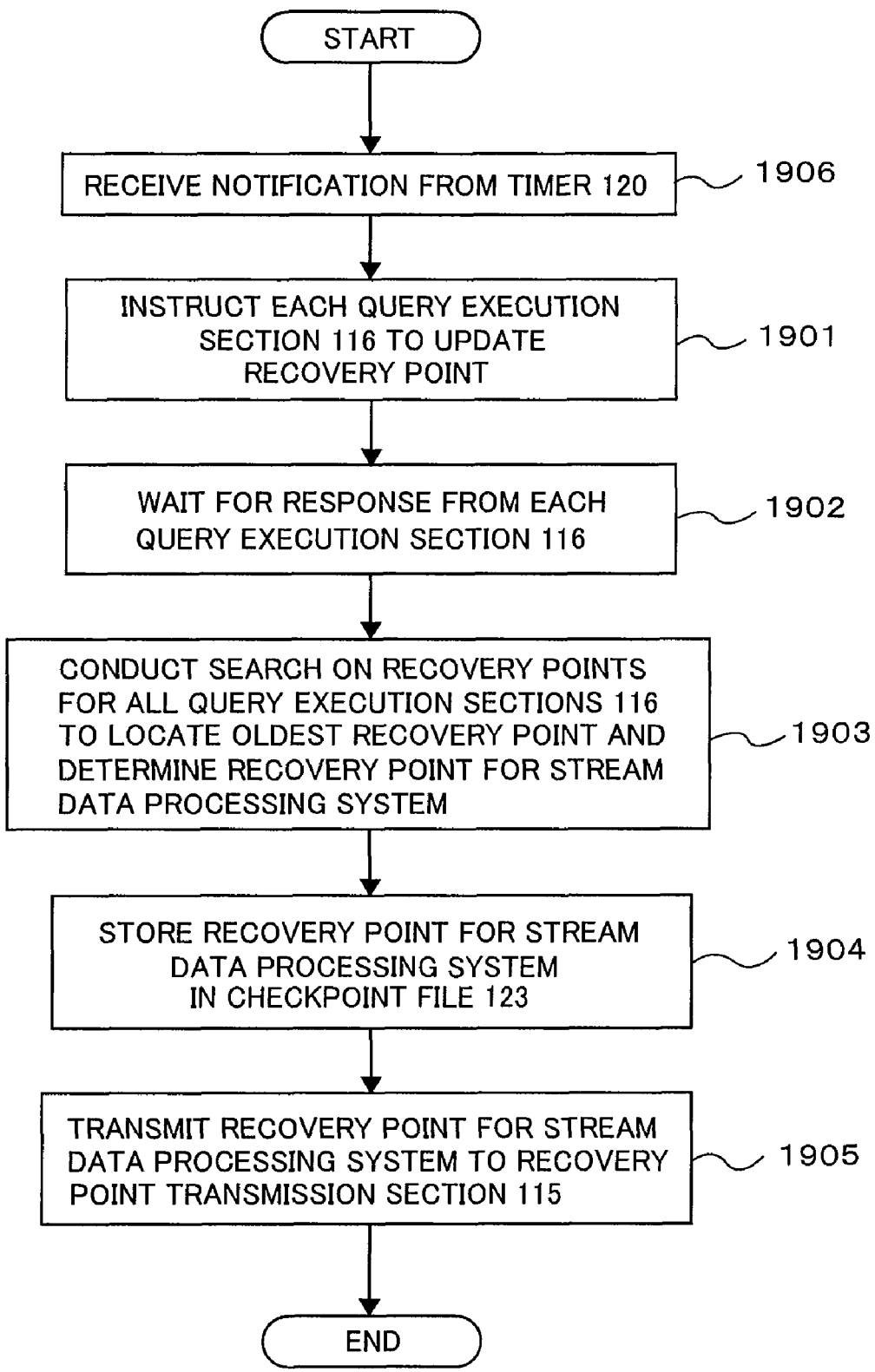
FIG. 19 is a flowchart illustrating an operation of a recovery point management section in accordance with the first embodiment.

FIG. 19 is a flowchart illustrating an operation of the recovery point management section 119, which is executed by the CPU 122 of the second computer 111. Upon receipt of a notification from the timer 120, the recovery point management section 119 starts operating (step 1906). The timer 120 is preset to send a notification to the recovery point management section 119 at 5-minute intervals or other predetermined time intervals.

The recovery point management section 119 instructs each unit of the query execution section 116 to update the recovery point (step 1901), and waits for a response from each unit of the query execution section 116 (step 1902).

Figure 20:
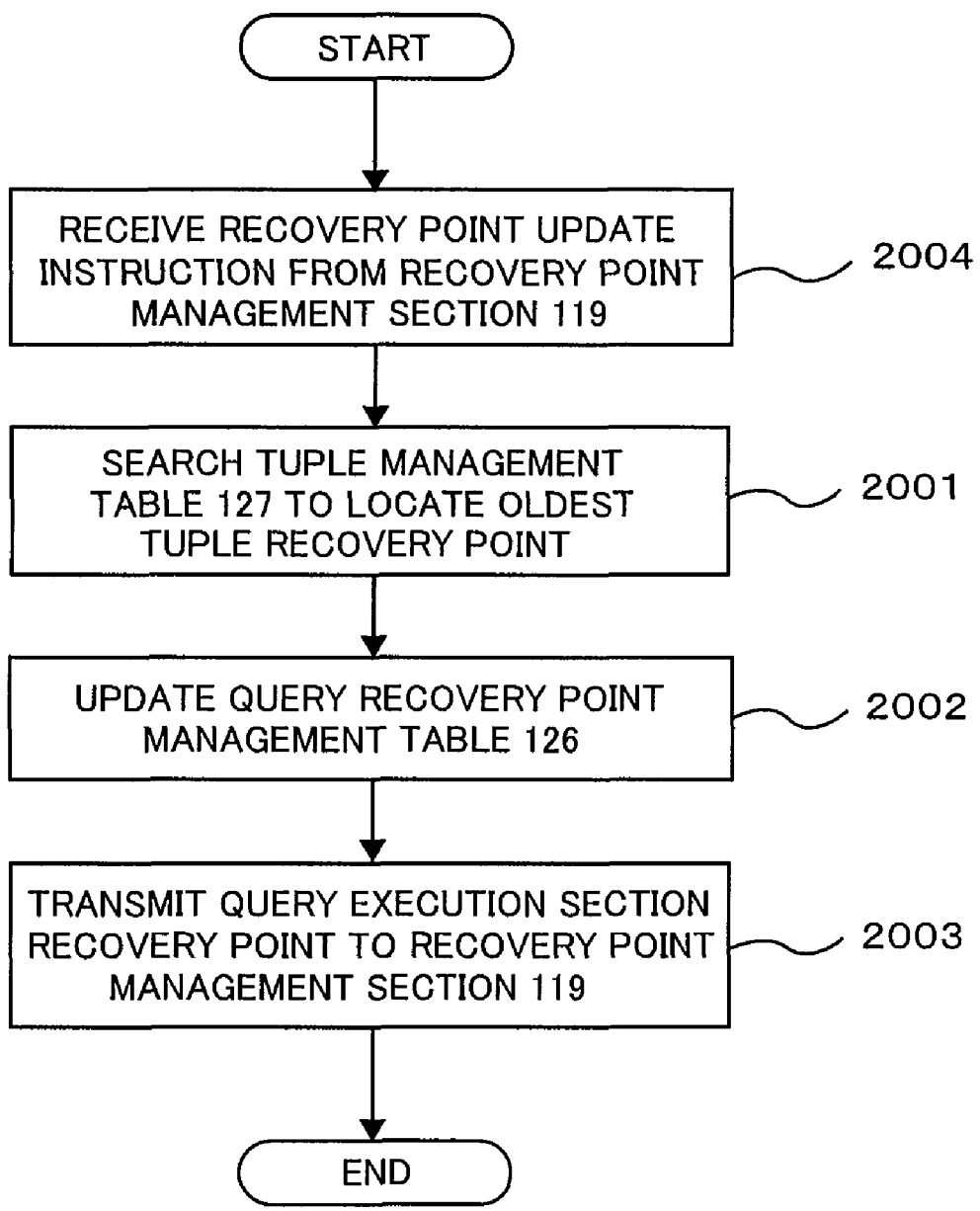
FIG. 20 is a flowchart illustrating an operation of the query execution section in accordance with the first embodiment.

FIG. 20 is a flowchart illustrating how the query execution section 116 operates upon receipt of an update instruction from the recovery point management section 119. Upon receipt of a recovery point update instruction (step 2004), the query execution section 116 conducts a search on tuple recovery points stored in the tuple management table 127 to detect the oldest recovery point (step 2001). Next, the query execution section 116 stores the detected recovery point in the query recovery point management table 126 to perform an update (step 2002), and then transmits this query execution section recovery point to the recovery point management section 119 (step 2003).

Figure 28:
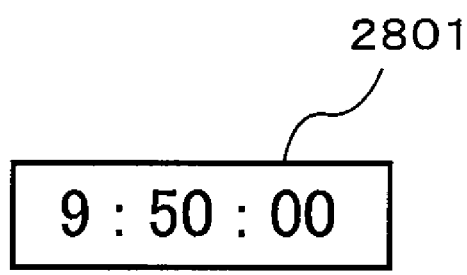
FIG. 28 is a diagram exemplifying the contents of a checkpoint file in accordance with the first embodiment.

Returning to the flowchart in FIG. 19, the recovery point management section 119 conducts a search on the recovery points for all units of the query execution section 116 to locate the oldest recovery point and determines the recovery point for the stream data processing system (step 1903). Next, the recovery point management section 119 stores the recovery point for the stream data processing system in a checkpoint file 123 on the disk 125 (step 1904). FIG. 28 exemplifies the contents of the checkpoint file 123. The checkpoint file 123 stores a recovery point 2801 for the stream data processing system. The checkpoint file 123 stores the information about the latest recovery point because the contents of the file are overwritten when the file stores new information.

Figures 30, 31:
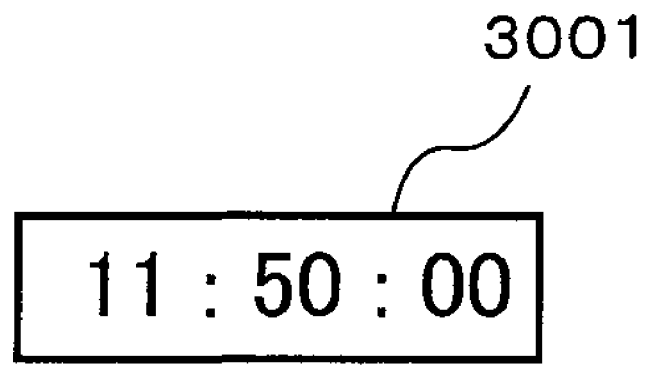
FIG. 30 is a diagram exemplifying the contents of a recovery point management table in accordance with the second embodiment.
FIG. 31 is a diagram exemplifying the contents of an output destination setup file in accordance with the first embodiment.

The storage area of the checkpoint file 123 is described beforehand in an output destination setup file 128. FIG. 31 exemplifies the contents of the output destination setup file 128. FIG. 31 indicates that the checkpoint file 123 is stored on drive C and named "CheckPoint". The recovery point management section 119 references the output destination setup file 128 to locate the checkpoint file and stores the recovery point 2801 for the stream data processing system in the located checkpoint file (step 1904). In step 1905, the recovery point management section 119 transmits the recovery point for the stream data processing system to the recovery point transmission section 115.

Figure 34:
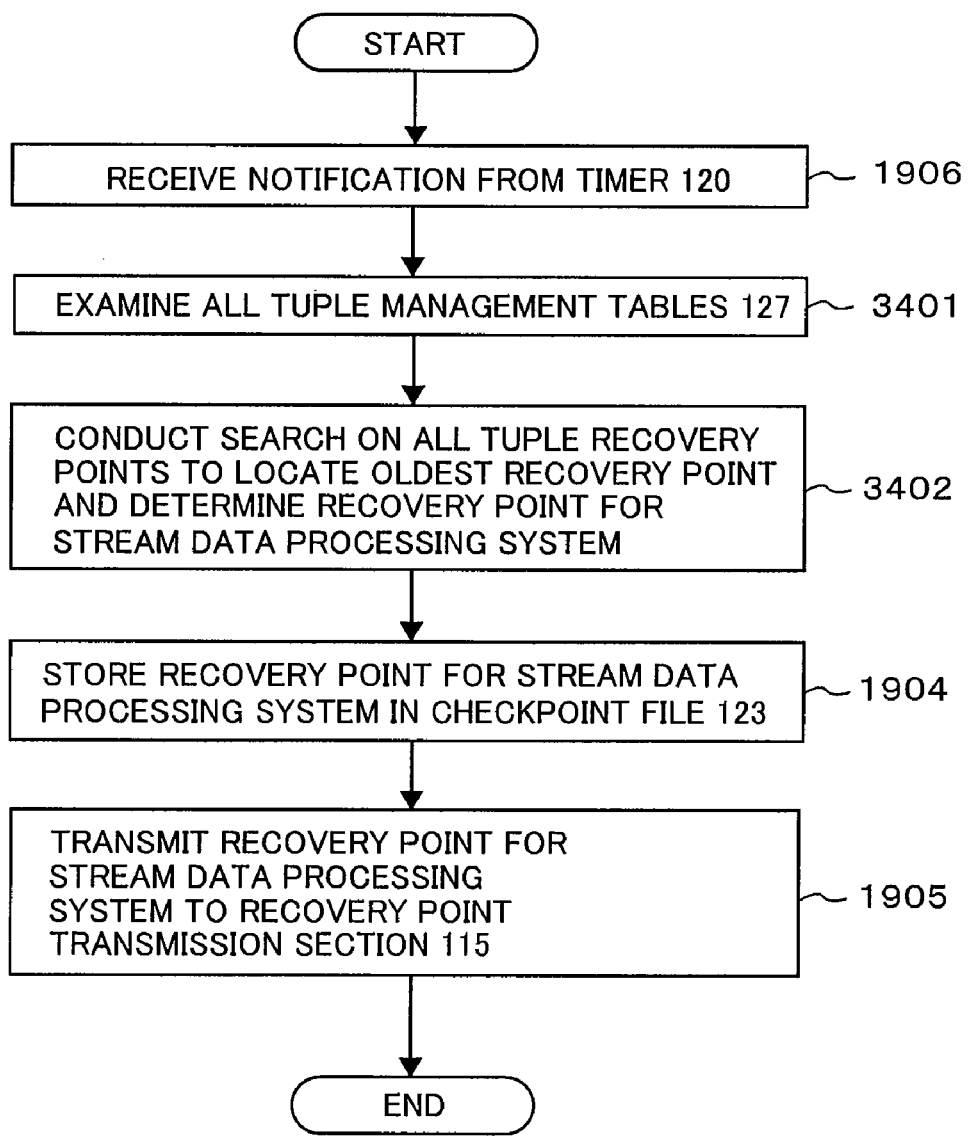
FIG. 34 is a flowchart illustrating an operation of the recovery point management section in accordance with a modification of the first embodiment.

The recovery point management section 119 may alternatively operate as indicated in a flowchart in FIG. 34 instead of operating as indicated in the above-described flowchart in FIG. 19. In this alternative case, the recovery point management section 119 examines all tuple management tables 127 upon receipt of a notification from the timer 120 (step 3401). Further, the recovery point management section 119 conducts a search on all tuple recovery points to locate the oldest recovery point and sets the oldest recovery point as the recovery point for the stream data processing system (step 3402). As described above, the recovery point management section 119 can determine the recovery point for the stream data processing system from all tuple recovery points without using the recovery point for the query execution section 116.

In the above-described alternative case, too, the recovery point transmission section 115 transmits the recovery point for the stream data processing system to the recovery point reception section 104 (step 1905) after receipt of the recovery point for the stream data processing system, as indicated in the flowchart in FIG. 34.

Figure 21:
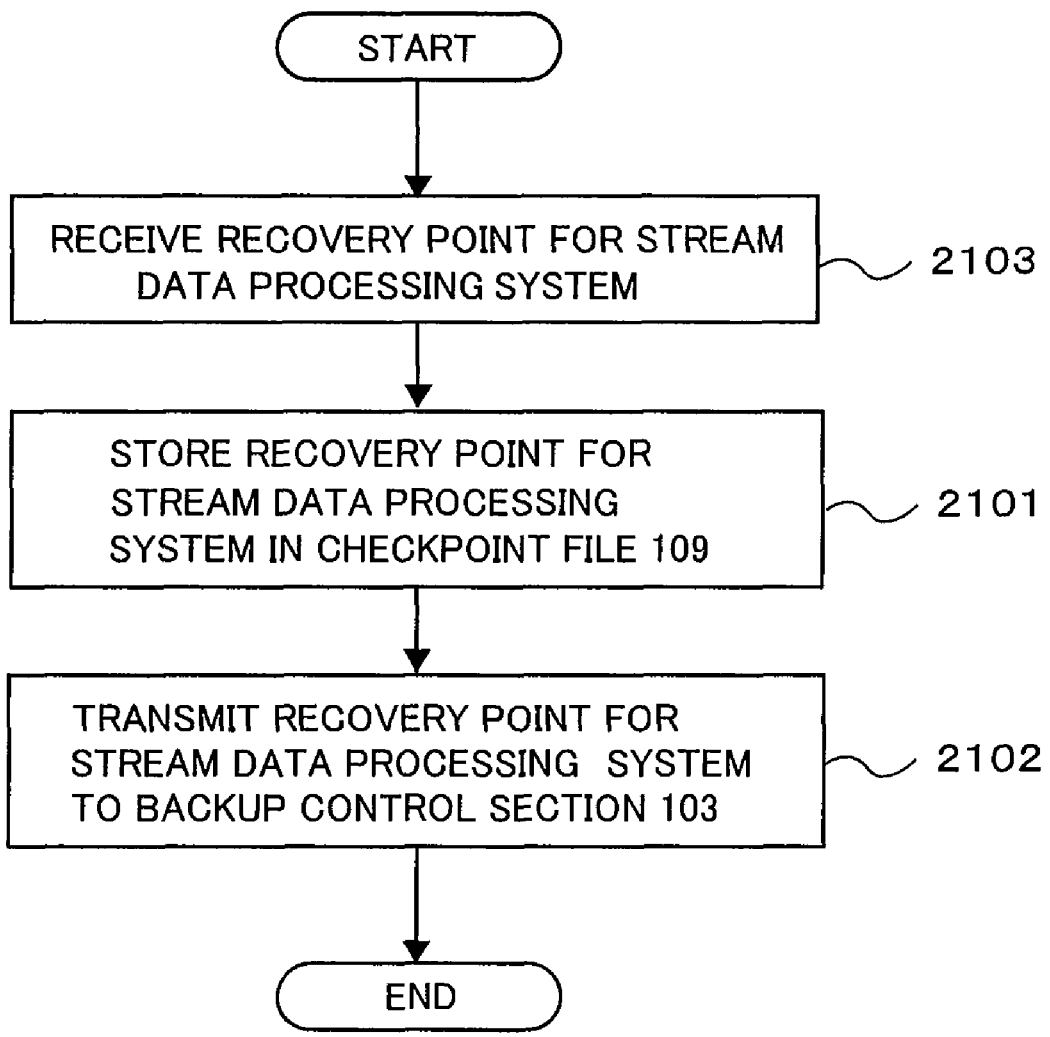
FIG. 21 is a flowchart illustrating an operation of a recovery point reception section in accordance with the first embodiment.

FIG. 21 is a flowchart illustrating an operation of the recovery point reception section 104 of the first computer 100. Upon receipt of a recovery point for the stream data processing system (step 2103), the recovery point reception section 104 starts operating. The recovery point reception section 104 stores the information about the received recovery point in the checkpoint file 109 on the disk 110 (step 2101). The employed storage format is the same as for the checkpoint file 123 on the disk 125. In step 2102, the recovery point reception section 104 transmits the recovery point for the stream data processing system to the backup control section 103.

The storage area of the checkpoint file 123 is described beforehand in an output destination setup file 129. FIG. 31 exemplifies the contents of the output destination setup file 129. FIG. 31 indicates that the checkpoint file 123 is stored on drive C and named "CheckPoint". The recovery point reception section 104 references the output destination setup file 129 to locate the checkpoint file and stores the recovery point 2801 for the stream data processing system in the located checkpoint file.

Figure 22:
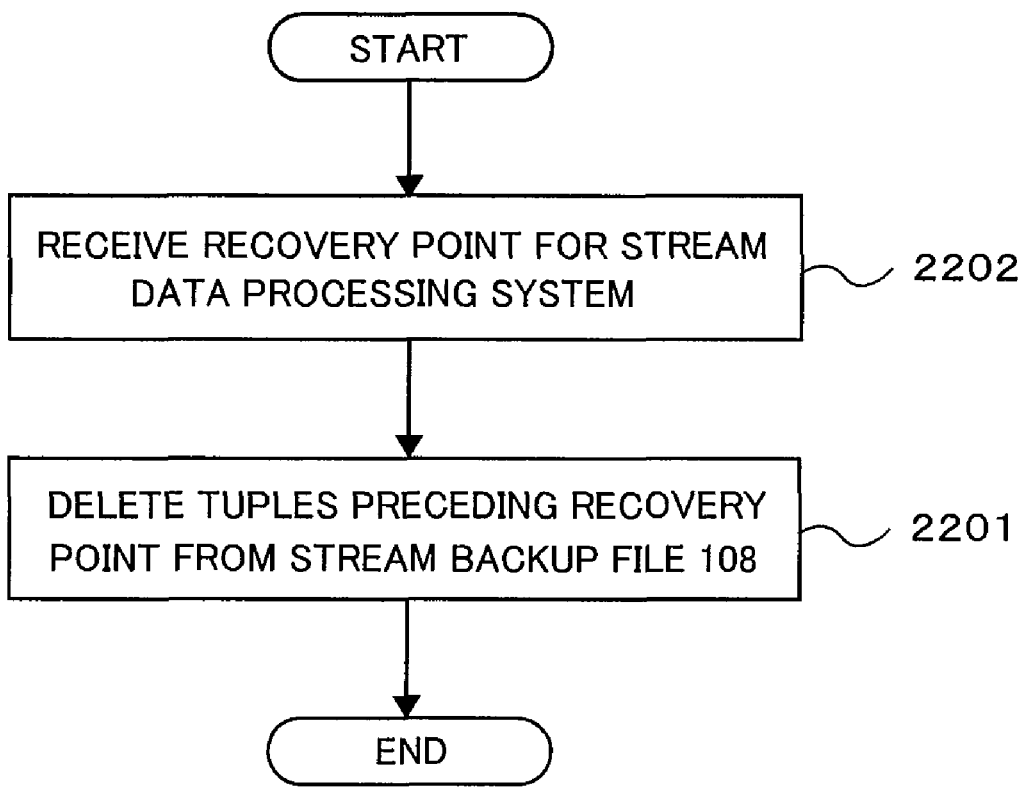
FIG. 22 is a flowchart illustrating an operation of the backup control section in accordance with the first embodiment.

FIG. 22 is a flowchart illustrating an operation that the backup control section 103 performs upon receipt of a recovery point for the stream data processing system. Upon receipt of the recovery point (step 2202), the backup control section 103 deletes tuples preceding the recovery point for the stream data processing system from the stream backup file 108 (step 2201).

Figure 23:
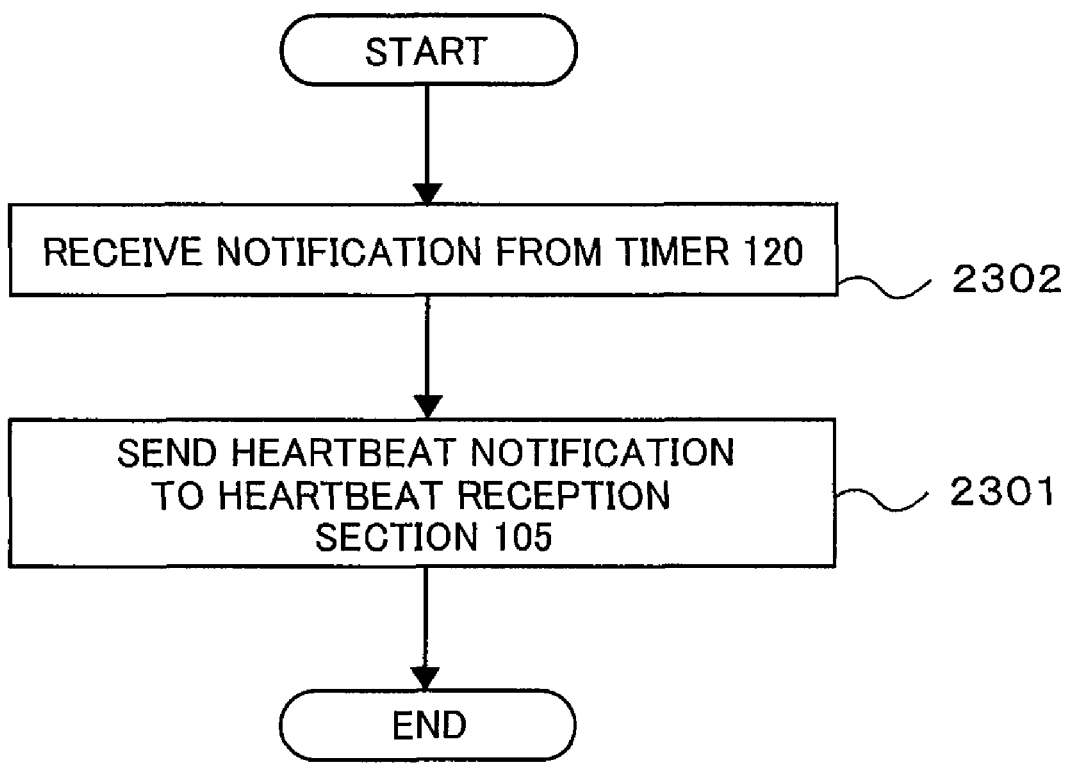
FIG. 23 is a flowchart illustrating an operation of a heartbeat transmission section in accordance with the first embodiment.

FIG. 23 is a flowchart illustrating an operation of the heartbeat transmission section 117 of the second computer 111. Upon receipt of a notification from the timer 120, the heartbeat transmission section 117 starts operating. The timer 120 is preset to send a notification to the heartbeat transmission section 117 at 1-second intervals or other predetermined time intervals. Upon receipt of a notification from the timer 120 (step 2302), the heartbeat transmission section 117 sends a heartbeat notification to the heartbeat reception section 105 of the first computer 100 (step 2301).

If the heartbeat notification cannot be received for 5 seconds or another predetermined period of time, the heartbeat reception section 105 concludes that the second computer 111 is faulty. If the heartbeat reception section 105 receives the heartbeat notification after concluding that the second computer 111 is faulty, the heartbeat reception section 105 concludes that the second computer 111 has achieved recovery, and then sends a fault recovery notification to the data management section 101.

Figure 24:
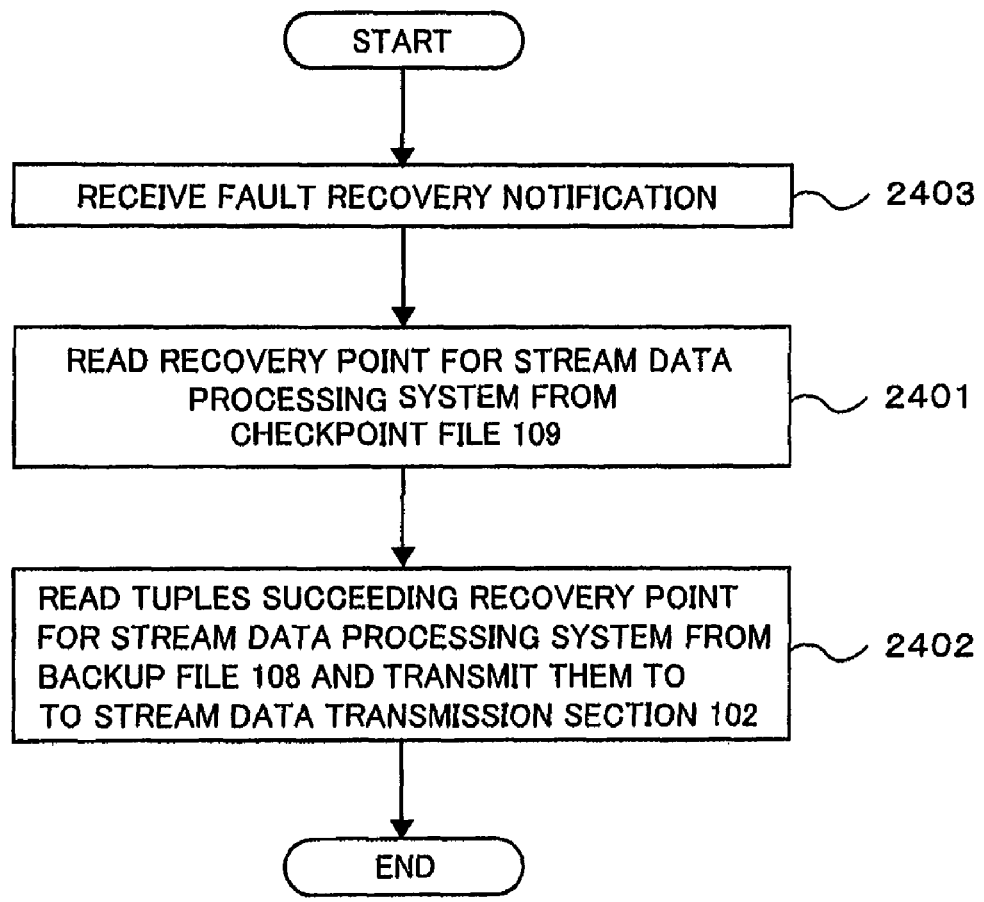
FIG. 24 is a flowchart illustrating an operation of the data management section in accordance with the first embodiment.

FIG. 24 is a flowchart illustrating an operation that the data management section 101 performs upon receipt of a fault recovery notification about the second computer 111. Upon receipt of the fault recovery notification (step 2403), the data management section 101 reads a recovery point for the stream data processing system from the checkpoint file 109 (step 2401). As shown in FIG. 28, the checkpoint file 109 stores the latest recovery point. The data management section 101 reads this latest recovery point.

Further, the data management section 101 reads tuples succeeding the recovery point for the stream data processing system from the stream backup file 108, and transmits them to the stream data transmission section 102 (step 2402).

The configuration according to the first embodiment, which has been described above, makes it possible to reenter an input stream without losing output tuples necessary for the resumption of data processing when the stream data processing system recovers from a fault.

Second Embodiment

Figure 25:
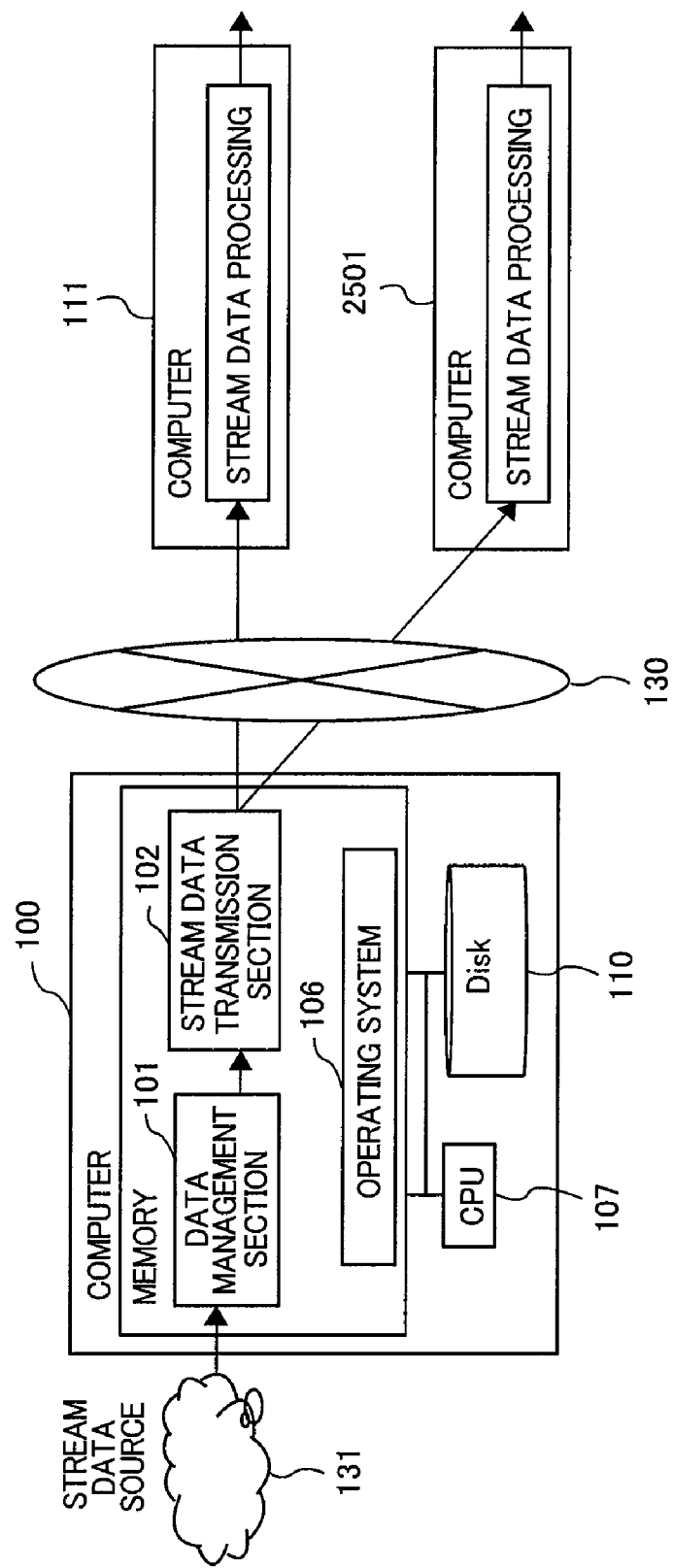
FIG. 25 is a diagram illustrating a system configuration for allowing two computers to perform stream data processing in a duplex manner in accordance with a second embodiment of the present invention.

FIG. 25 is a diagram illustrating the configuration of a stream data processing system according to a second embodiment of the present invention, that is, the configuration of a system for allowing two computers to perform stream data processing in a duplex manner. The stream data transmission section 102 of a first computer 100 transmits the same tuples to a second computer 111 and to a third computer 2501. In FIG. 25, the processes performed by various sections 112-120 shown in FIG. 1 are collectively indicated as the stream data processing operations to be performed by the second computer 111 and the third computer 2501.

Even when one of the second computer 111 and third computer 2501 becomes faulty, the system according to the second embodiment, which is shown in FIG. 25, continuously performs stream data processing as far as the other of the second and third computers is operating normally.

Referring to FIG. 25, it is now assumed for illustrative purposes that the third computer 2501 is faulty. In this case, stream data processing is performed by only one of the two computers, that is, the second computer 111. It means that the fault tolerance of the system is decreased. It is therefore necessary that the third computer 2501 achieve recovery and resume its stream data processing.

A method for enabling the third computer 2501 to achieve recovery and resume its stream data processing would be to process stream data by using tuples transmitted from the stream data transmission section 102.

As the second computer 111 is not faulty, it is processing stream data uninterruptedly. On the other hand, the third computer 2501 is faulty; therefore, it has lost the information about tuples stored in a volatile memory. Consequently, immediately after recovery of the third computer, the information about tuples managed by the second computer 111 differs from the information about tuples managed by the third computer 2501. It means that the results of stream data processing performed by the two computers differ from each other. The period during which the two computers produce different stream data processing results is referred to as the warm-up period.

If the stream data processing function of the third computer 2501 is used during the warm-up period, the loss of output tuples occurs, that is, tuples that are output when there is no fault, will not be output due to a fault. Therefore, the stream data processing function of the third computer 2501 cannot be used until the warm-up period ends.

A method for avoiding the loss of output tuples by using a recovery point in the system according to the second embodiment, which performs stream data processing in a duplex manner through the use of two computers, will now be described.

Figure 26:
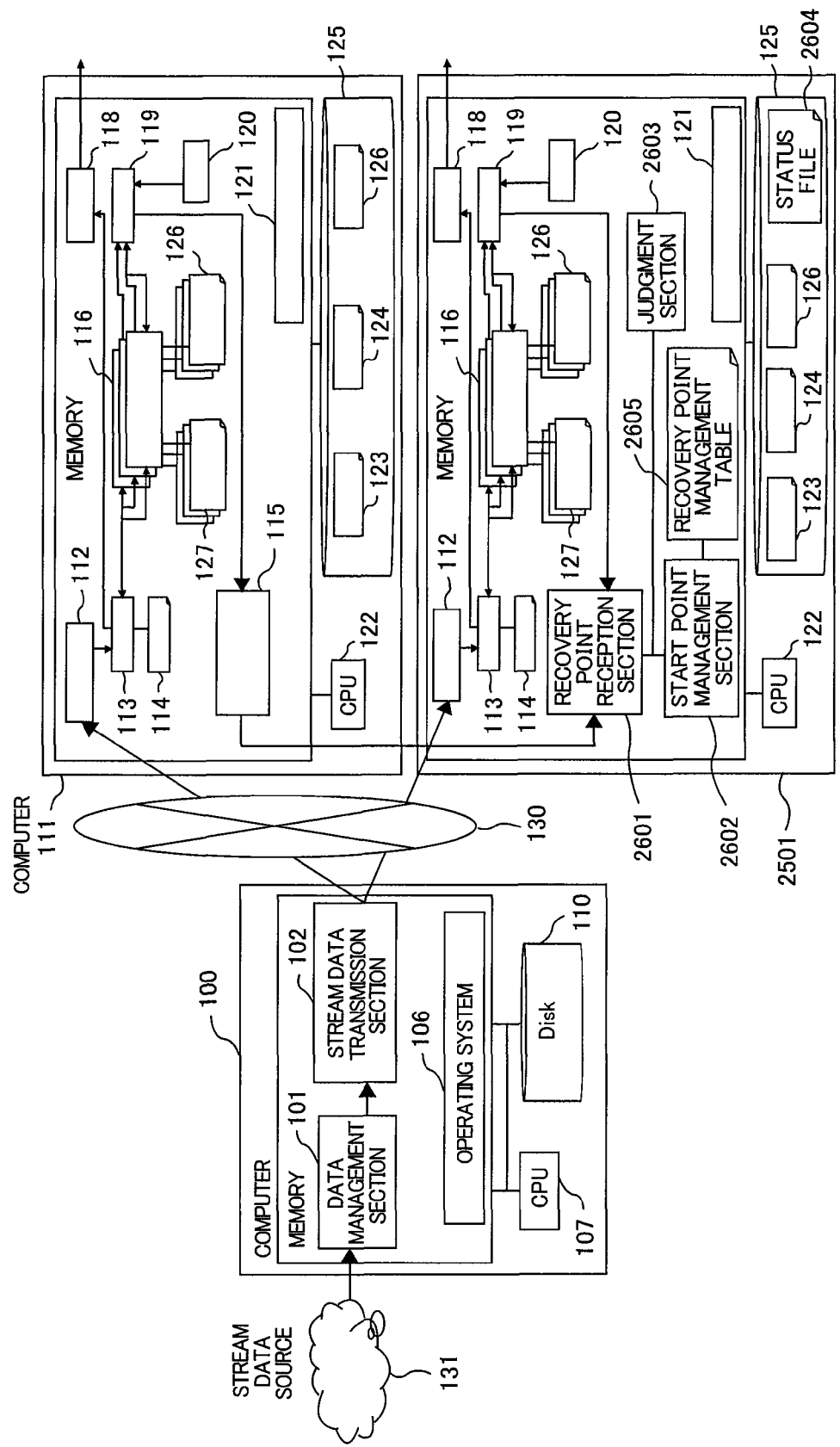
FIG. 26 is a diagram illustrating an exemplary stream data processing system for allowing two computers to perform stream data processing in a duplex manner in accordance with the second embodiment.

FIG. 26 is a diagram illustrating a concrete example of the system according to the second embodiment, which performs stream data processing in a duplex manner through the use of two computers. Like elements in FIGS. 1 and 26 are identified by the same reference numerals. Various sections of the second computer 111 perform the same operations as described earlier. In the configuration according to the present embodiment, however, the recovery point transmission section 115 transmits the recovery point for the stream data processing system to a recovery point reception section 2601 of the third computer 2501.

Various sections of the third computer 2501 perform the same operations as those of the second computer 111, which have been described earlier. In the third computer 2501, however, the recovery point reception section 2601, a start point management section 2602, and a judgment section 2603 operate differently. These sections are programs that are stored in a memory of the third computer 2501 and executed by the CPU 122, as is the case with the functional elements described earlier.

The start point management section 2602 is a program that stores in a start point management table a start point, which is the information identifying the first received tuple when the third computer resumes its stream data processing after recovering from a fault.

The judgment section 2603 is a program that compares the information about a recovery point received from the recovery point reception section 2601 against the information about a recovery point received from the start point management section 2602 to judge whether the stream data processing system of the third computer is available.

When the third computer 2501 resumes its stream data processing after the occurrence of a fault in the third computer 2501, the start point management section 2602 stores in the start point management table a start point, which is the information identifying the first received tuple. FIG. 30 is a diagram exemplifying the contents of a recovery point management table 2605. The recovery point management table 2605 stores a timestamp 3001 for the first received tuple.

Upon receipt of the information about a recovery point from the second computer 111, the recovery point reception section 2601 conveys the information to the judgment section 2603.

Figure 27:
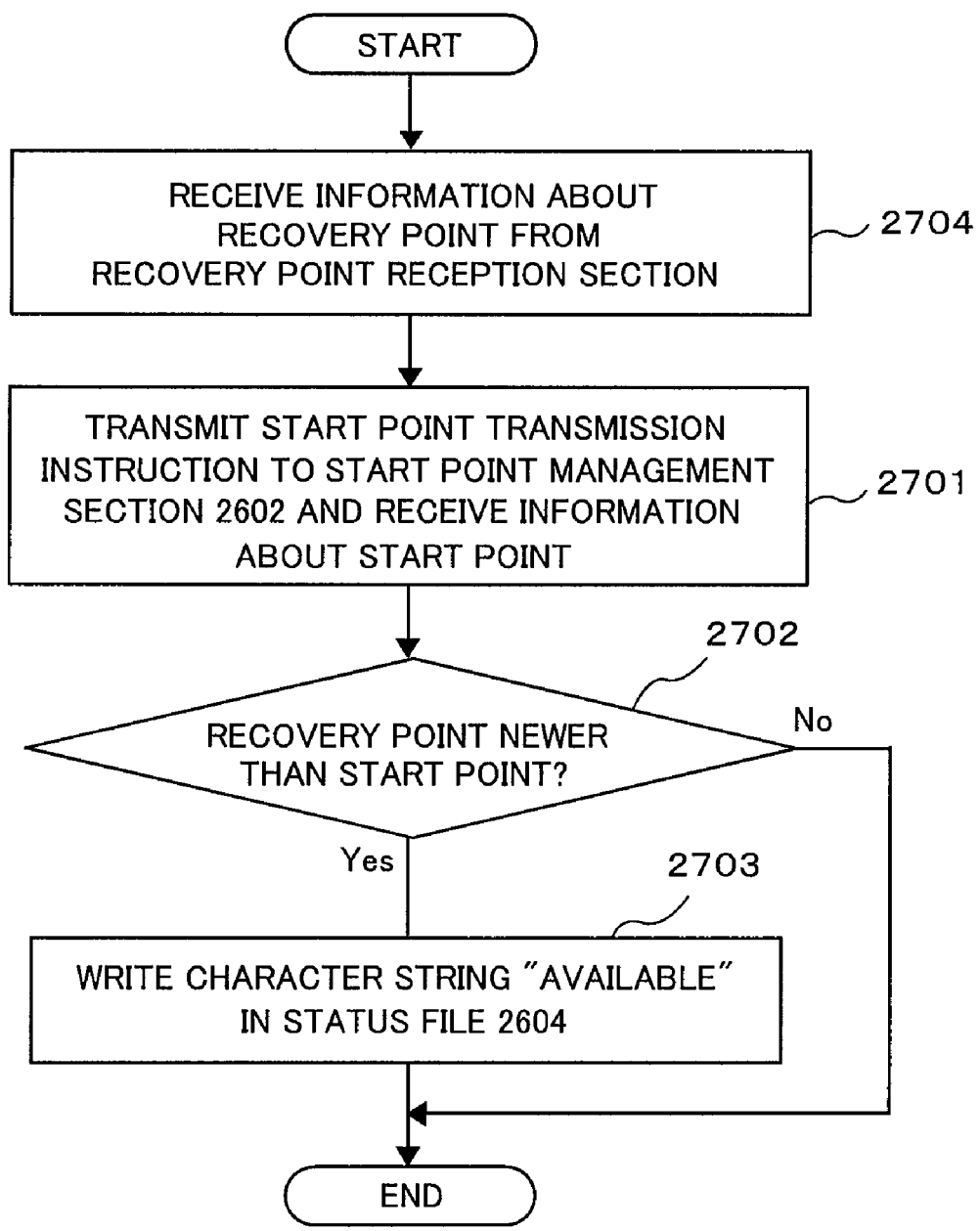
FIG. 27 is a flowchart illustrating an operation of a judgment section in accordance with the second embodiment.

FIG. 27 is a flowchart illustrating an operation of the judgment section 2603, which is a program executed by the third computer 2501. Upon receipt of the information about a recovery point from the recovery point reception section 2601 (step 2704), the judgment section 2603 starts operating. The judgment section 2603 transmits a start point transmission instruction to the start point management section 2602 and receives the information about a start point from the start point management section 2602 (step 2701). Next, the judgment section 2603 compares the recovery point against the start point to judge whether the recovery point is newer than the start point (step 2702). If the result of judgment is YES, the judgment section 2603 stores in a status file 2604 on the disk 125 the information indicating that the stream data processing system of the third computer 2501 is available (step 2703).

Figure 29:
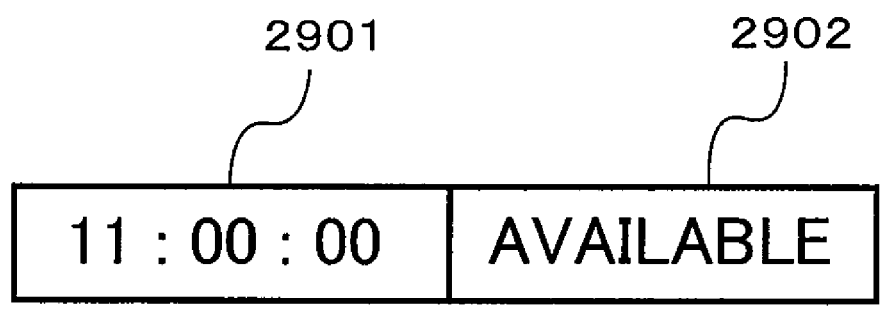
FIG. 29 is a diagram exemplifying the contents of a status file in accordance with the second embodiment.

FIG. 29 is a diagram exemplifying the contents of the status file 2604. The status file 2604 stores the character string "AVAILABLE" 2902 and the time 2901 at which the third computer was judged by the judgment section 2603 to be available.

Third Embodiment

Figure 32:
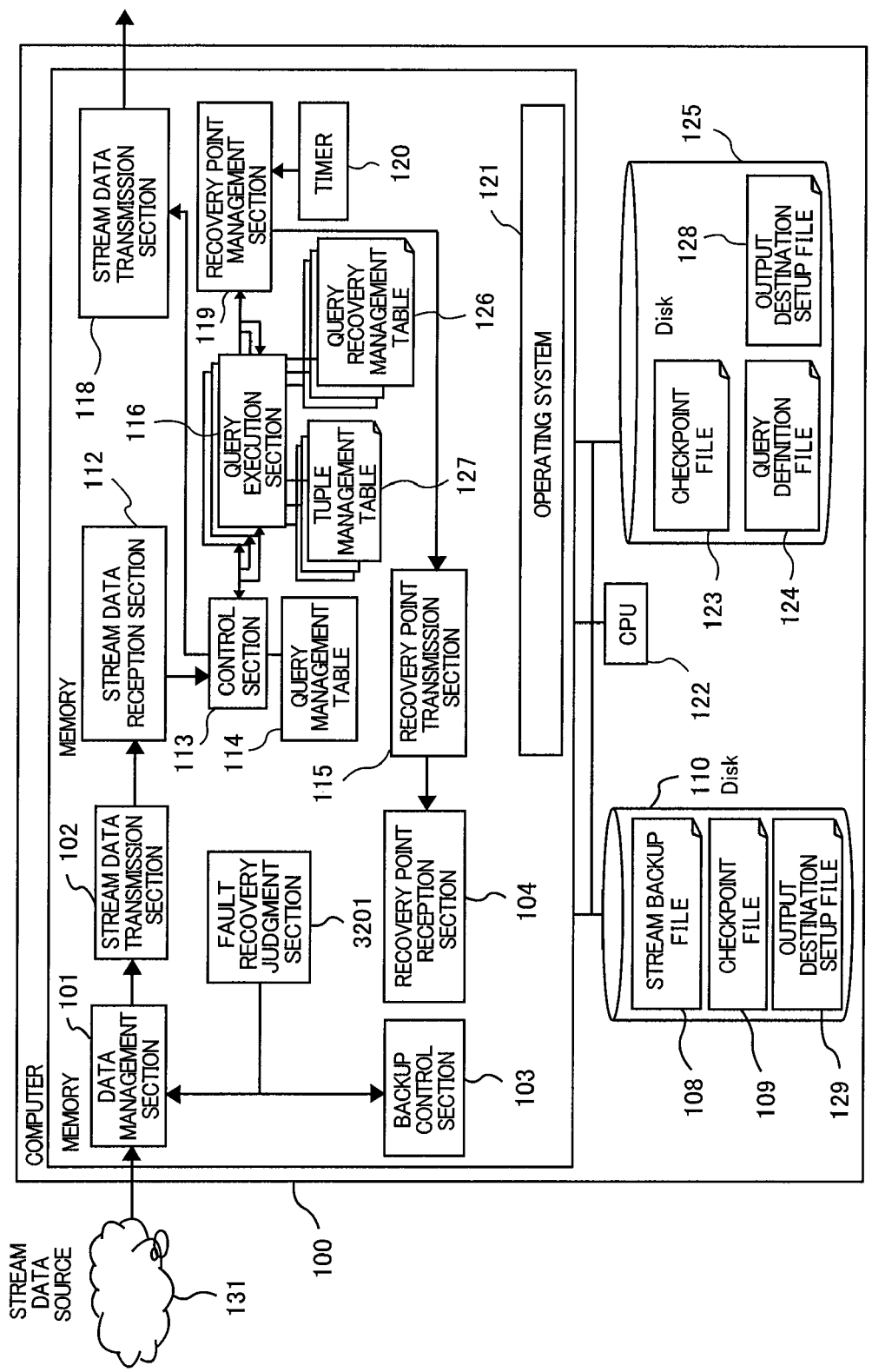
FIG. 32 is a diagram illustrating the configuration of the stream data processing system according to a third embodiment of the present invention.

FIG. 32 is a diagram illustrating a system configuration according to a third embodiment of the present invention in which the stream data processing system shown in FIG. 1 is operated with only one computer 100. The third embodiment, in which the system is operated with a single computer 100, differs from the first embodiment in that a fault recovery judgment section 3201 operates although the network 130, heartbeat reception section 105, and heartbeat transmission section 117 do not operate. The fault recovery judgment section 3201 is a program that is stored in a memory and executed by the CPU 122. It goes without saying that the disks 110, 125 may be incorporated in a single disk drive.

Figure 33:
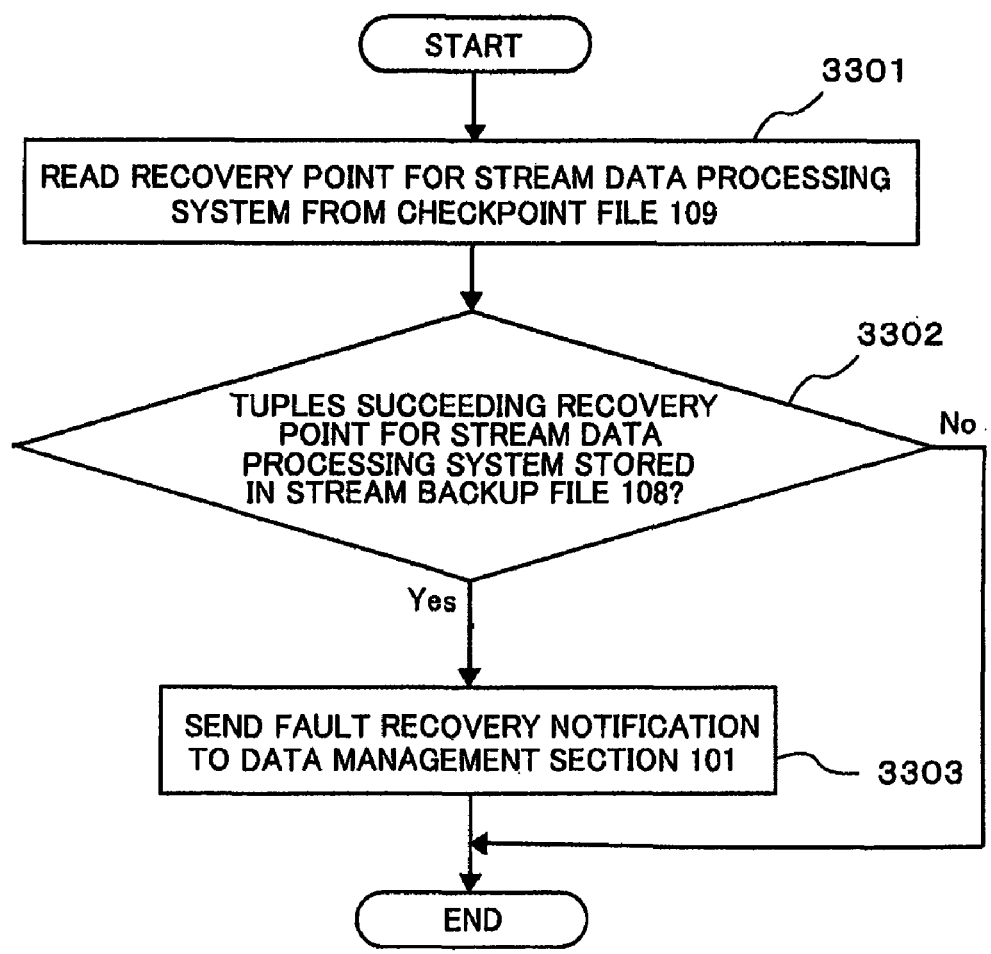
FIG. 33 is a flowchart illustrating an operation of a fault recovery judgment section in accordance with the third embodiment.

FIG. 33 is a flowchart illustrating an operation of the fault recovery judgment section 3201, which is a program executed by the CPU 122. The fault recovery judgment section 3201 starts operating when the computer 100 starts up. The fault recovery judgment section 3201 first reads a recovery point for the stream data processing system from the checkpoint file 109 (step 3301). Next, the fault recovery judgment section 3201 judges whether tuples succeeding the recovery point for the stream data processing system are stored in the stream backup file 108 (step 3302). If the tuples succeeding the recovery point for the stream data processing system are stored in the stream backup file 108, the fault recovery judgment section 3201 sends a fault recovery notification to the data management section 101 (step 3303).

Fourth Embodiment

Figure 35:
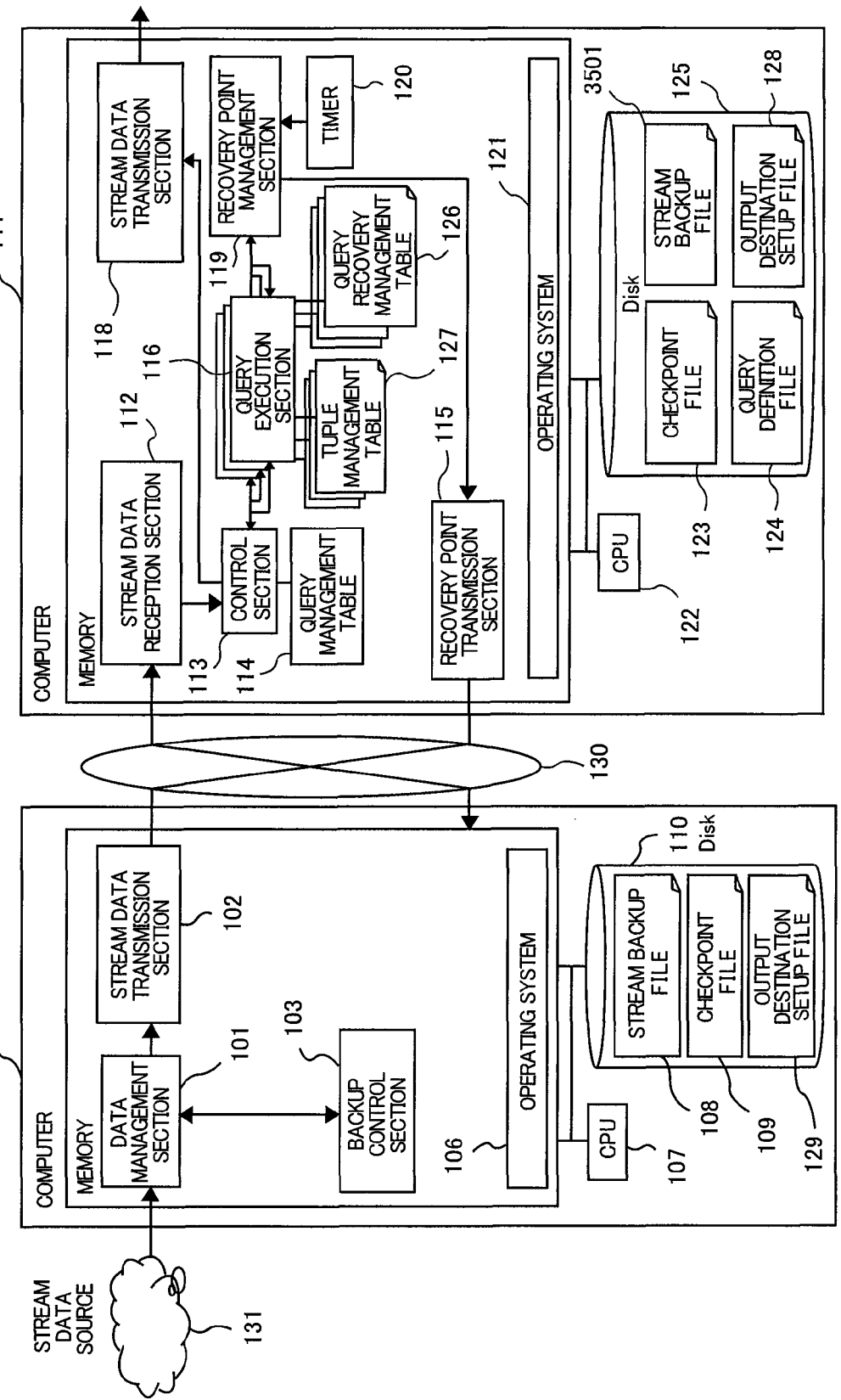
FIG. 35 is a diagram illustrating the stream data processing system according to a fourth embodiment of the present invention, which backs up stream data with a second computer.

FIG. 35 is a diagram illustrating a system according to a fourth embodiment of the present invention, which backs up stream data with the second computer 111. The second computer 111 backs up stream data by storing a stream backup file 3501 on the disk 125 of the second computer 111.

In the first computer 100, the recovery point reception section 104 and heartbeat reception section 105 do not operate. Further, the heartbeat transmission section 117 does not operate in the second computer 111.

The fourth embodiment differs from the first embodiment in the operations of the stream data reception section 112 and recovery point management section 119. The operations of the stream data reception section 112 and recovery point management section 119 according to the fourth embodiment will now be described.

Figure 36:
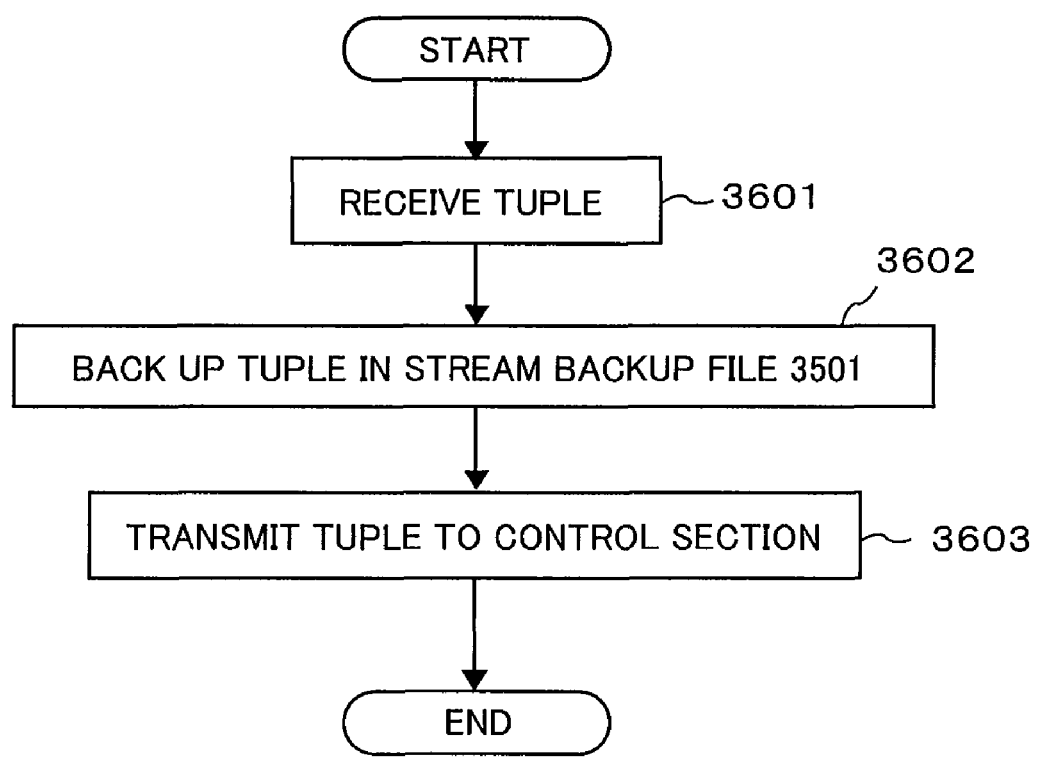
FIG. 36 is a flowchart illustrating an operation that a stream data reception section performs in accordance with the fourth embodiment when a tuple is received from a stream data transmission section.

FIG. 36 is a flowchart illustrating an operation that the stream data reception section 112 performs upon receipt of a tuple from the stream data transmission section 102. In step 3602, the stream data reception section 112 backs up the received tuple in the stream backup file 3501. In step 3603, the stream data reception section 112 transmits the received tuple to the control section 113.

The recovery point transmission section 115 receives the information about a recovery point from the recovery point management section 119 and transmits the received information to the stream data reception section 112. Upon receipt of the information about a recovery point, the stream data reception section 112 deletes tuples preceding the recovery point from the stream backup file 3501.

Figure 37:
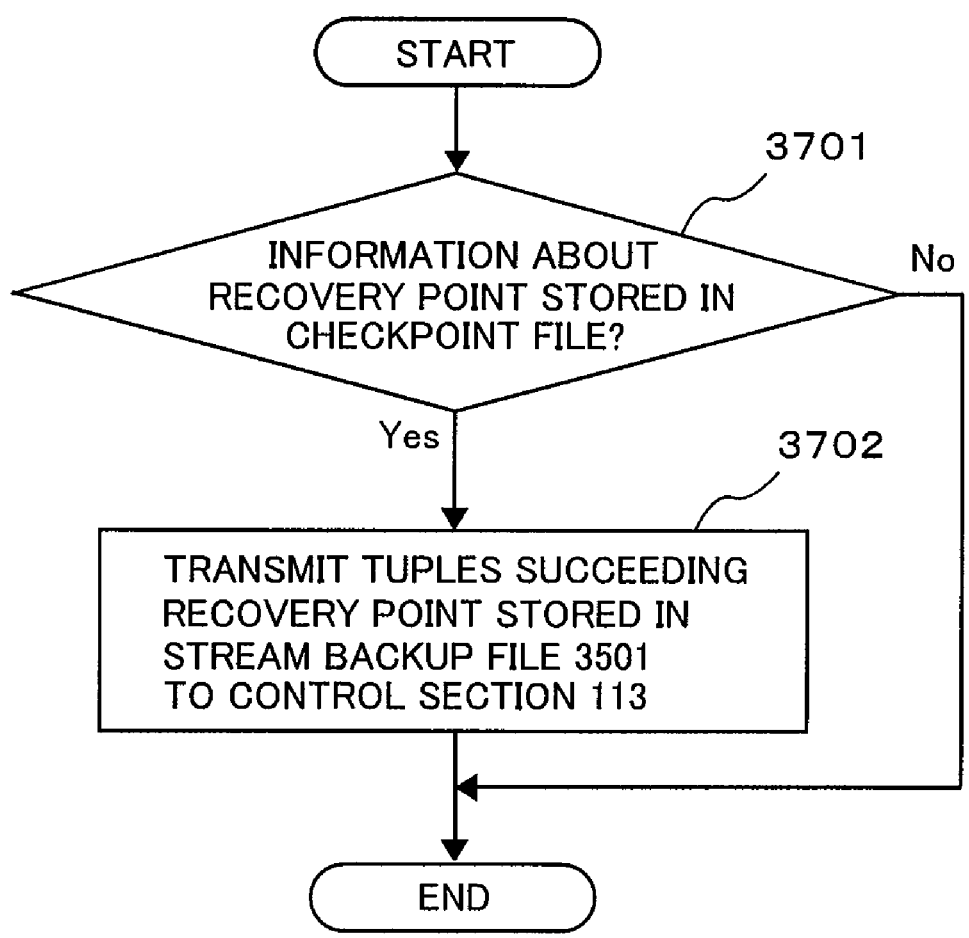
FIG. 37 is a flowchart illustrating an operation that is performed in accordance with the fourth embodiment when the stream data reception section starts up.

FIG. 37 is a flowchart illustrating an operation that is performed when the stream data reception section 112 starts up. The operation shown in FIG. 37 is performed by the stream data reception section 112 before it receives a tuple. In step 3701, the stream data reception section 112 judges whether the information about a recovery point is stored in the checkpoint file 123. If the information about a recovery point is stored, the stream data reception section 112 performs step 3702 to transmit tuples succeeding the recovery point stored in the stream backup file 3501 to the control section 113.

The present embodiment makes it possible to recover from a fault with the second computer alone. This eliminates the necessity of transmitting backed-up tuples from the first computer and prevents the inter-computer network from being burdened.

The present invention is useful for a stream data processing system and, more particularly, for a real-time data processing technology for processing tuples, which are time-stamped data.

What is claimed is:

1. A stream data processing system including at least one computer for processing tuples which are time-stamped stream data, the stream data processing system comprising:
a stream data reception section that receives a plurality of first tuples;
a query execution section that performs a data process on the first tuples to generate a plurality of second tuples;
a stream data transmission section that transmits the second tuples generated by the query execution section; and
a recovery point management section that determines a recovery point for the stream data processing system, the recovery point being the information identifying the oldest one of the first tuples used for generating the second tuples or identifying a first tuple which is received by the stream data reception section earlier than the oldest one of the first tuples used for generating the second tuples;
wherein the query execution section adds tuple recovery point attribute values to the generated second tuples, the tuple recovery point attribute values being the information identifying the oldest one of the first tuples used for generating the second tuples or identifying the first tuple which is received by the stream data reception section earlier than the oldest one of the first tuples used for generating the second tuples; and
wherein the recovery point management section determines the recovery point for the stream data processing system by conducting a search on all the tuple recovery point attribute values managed by the stream data processing system to locate the oldest recovery point.

2. The stream data processing system according to claim 1, further comprising:
a control section that receives the first or second tuples from the stream data reception section or the query execution section and transmits the received tuples to the query execution section or the stream data transmission section;
wherein the control section sets the information identifying the first tuples as the tuple recovery point attribute values for the first tuples received from the stream data reception section;
wherein the query execution section sets the information identifying the oldest one of the tuples representing recovery points for the first tuples to be processed by the query execution section or identifying the first tuple which is received by the stream data reception section earlier than the oldest one of the first tuples used for generating the second tuples as a recovery point attribute value for the query execution section, and sets the recovery point attribute value for the query execution section as a recovery point attribute value of the second tuples to be generated; and
wherein the recovery point management section determines the recovery point for the stream data processing system by conducting a search on attribute values of the recovery points for all units of the query execution section to locate the oldest recovery point.

3. The stream data processing system according to claim 2,
wherein the recovery point management section instructs the query execution section to update a recovery point for the query execution section;
wherein, upon receipt of the update instruction, the query execution section updates the attribute value of a recovery point for the query execution section to the oldest one of the recovery points for the first tuples managed by the query execution section; and
wherein the recovery point management section determines the recovery point for the stream data processing system by conducting a search on the recovery points for all units of the query execution section to locate the oldest recovery point, and stores the determined recovery point for the stream data processing system.

4. The stream data processing system according to claim 2, further comprising:
a first computer and a second computer, the first and second computers being interconnected through a network;
wherein the first computer includes:
a storage section;
a data management section that issues an instruction for transmitting the first tuples;
a tuple transmission section that transmits the first tuples;
a backup control section that stores the transmitted first tuples in the storage section, and
a recovery point reception section that receives the information about a recovery point from the second computer;
wherein the second computer includes the stream data reception section, the control section, the query execution section, the recovery point management section, and a recovery point transmission section that transmits the information about a recovery point for the stream data processing system to the recovery point reception section;
wherein the recovery point reception section conveys the received information about the recovery point to the backup control section; and
wherein the backup control section deletes the first tuples preceding the received recovery point for the stream data processing system from the storage section.

5. The stream data processing system according to claim 4,
wherein the second computer includes a heartbeat transmission section that sends a communication to the first computer at predetermined time intervals;

wherein the first computer includes a heartbeat reception section that receives the communication from the second computer;

wherein the heartbeat reception section of the first computer concludes, if no communication is received from the first computer for a predetermined period of time, that the second computer is faulty, and concludes, if a communication is received from the second computer after the occurrence of a fault in the second computer, that the second computer has achieved recovery, and notifies the data management section that the second computer has achieved recovery; and wherein, upon receipt of a notification that the second computer has achieved recovery, the data management section issues an instruction for transmitting the first tuples to the second computer, beginning with one of the first tuples identified by the last-received recovery point for the stream data processing system.

6. The stream data processing system according to claim 2, further comprising:

a first computer;

wherein the first computer includes a data management section that issues an instruction for transmitting the first tuples; a tuple transmission section that transmits the first tuples; a backup control section that stores the transmitted first tuples in the storage section; the recovery point reception section; the stream data reception section; the control section; the query execution section; and the recovery point management section.

7. The stream data processing system according to claim 2, further comprising:

a first computer, a second computer, and a third computer, the first, second, and third computers being interconnected through a network;

wherein the first computer includes a data management section that issues an instruction for transmitting the first tuples, and a stream data transmission section that transmits the first tuples to the second computer and the third computer;

wherein the second computer includes the stream data reception section, the control section, the query execution section, the recovery point management section, and a recovery point transmission section that transmits the information about a recovery point for the stream data processing system to the third computer;

wherein the third computer includes the stream data reception section, the control section, the query execution section, the recovery point management section, a start point management section that manages a start point which is the information identifying the first tuples received after stream data processing is started by the third computer, a recovery point reception section that receives the information about the recovery point from the second computer, and a judgment section that judges whether the third computer is available;

wherein the judgment section compares the information about the recovery point received from the second computer against the start point, the start point being the information identifying the first tuples, and concludes, if the recovery point received from the second computer is newer than the start point, that the third computer is available.

8. The stream data processing system according to claim 2, wherein the control section sets timestamps for the first tuples as the tuple recovery point attribute values for the first tuples received from the stream data reception section.

9. The stream data processing system according to claim 2, wherein stream data identifiers for identifying received stream data are assigned to the first tuples received by the stream data reception section;

wherein the control section sets timestamps for the first tuples as the tuple recovery point attribute values for the first tuples received from the stream data reception section;

wherein the query execution section sets the attribute value of a recovery point for the query execution section for each of the stream data identifiers as a recovery point for the second tuples to be generated; and wherein the recovery point management section determines the recovery point for the stream data processing system by conducting a search on each of the stream data identifiers to locate the oldest recovery point.

10. The stream data processing system according to claim 2, further comprising:

a first computer and a second computer, the first and second computers being interconnected through a network;

wherein the first computer includes a data management section for issuing an instruction for transmitting the first tuples, and a tuple transmission section for transmitting the first tuples;

wherein the second computer includes a storage section, the stream data reception section, the control section, the query execution section, the recovery point management section, and a recovery point transmission section for transmitting the information about a recovery point for the stream data processing system to the stream data reception section; and wherein the stream data reception section stores the received first tuples in the storage section and deletes the first tuples preceding the received recovery point for the stream data processing system from the storage section.

11. A stream data processing method for use with a stream data processing system having a processing section for receiving first tuples, which are time-stamped data, and generating second tuples by performing a query, which is a data process on the first tuples, the stream data processing method comprising:

giving, by the processing section, a tuple recovery point to the second tuples as an attribute value, the tuple recovery point being the information identifying the oldest one of the first tuples used for generating the second tuples managed by the stream data processing system or identifying a first tuple which is received by the stream data reception section earlier than the oldest one of the first tuples used for generating the second tuples;

where the query execution section adds tuple recovery point attribute values to the generated second tuples, the tuple recovery point attribute values being the information identifying the oldest one of the first tuples used for generating the second tuples or identifying the first tuple which is received by the stream data reception section earlier than the oldest one of the first tuples used for generating the second tuples; and determining a recovery point for the stream data processing system by conducting a search on all the tuple recovery point attribute values managed by the stream data processing system to locate the oldest recovery point.

12. The stream data processing method according to claim 11, wherein the processing section gives a query recovery point, as an attribute value, to the query performed by the processing section, the query recovery point being the information identifying the oldest one of the first tuples representing the recovery points to be processed by the query or identifying the first tuple which is received by the stream data reception section earlier than the oldest one of the first tuples used for generating the second tuples, sets the given query recovery point as the tuple recovery point for the second tuples generated by the query, and determines the recovery point for the stream data processing system by conducting a search on all query recovery points to locate the oldest recovery point.

13. A computer for use with a system, the computer comprising:

- a processing section that receives first tuples, which are time-stamped data, and generates second tuples by performing a query, which is a data process on the first tuples; and
- a storage section;
- wherein the processing section includes:
  - a stream data reception section that receives the first tuples,
  - a query execution section that generates the second tuples by performing a data process on the first tuples,
  - a stream data transmission section that transmits the second tuples generated by the query execution section, and
  - a recovery point management section that determines a recovery point for the system, the recovery point being the information identifying the oldest one of the first tuples used for generating the second tuples or identifying a first tuple which is received by the stream data reception section earlier than the oldest one of the first tuples used for generating the second tuples;
- wherein the query execution section adds tuple recovery point attribute values to the generated second tuples, the tuple recovery point attribute values being the information identifying the oldest one of the first tuples used for generating the second tuples or identifying the first tuple which is received by the stream data reception section earlier than the oldest one of the first tuples used for generating the second tuples; and
- wherein the recovery point management section determines the recovery point for the stream data processing system by conducting a search on all the tuple recovery point attribute values managed by the stream data processing system to locate the oldest recovery point.

14. The computer according to claim 13,

- wherein the processing section further includes a control section for receiving the tuples from the stream data reception section or the query execution section and transmitting the received tuples to the query execution section or the stream data transmission section;
- wherein the control section sets the information identifying the first tuples as an attribute value of a tuple recovery point for the first tuples received from the stream data reception section;
- wherein the query execution section sets the information identifying the oldest tuple representing the tuple recovery point to be processed by the query execution section or identifying the first tuple which is received by the stream data reception section earlier than the oldest one of the first tuples used for generating the second tuples as an attribute value of a recovery point for the query execution section, and sets an attribute value of the recovery point for the query execution section as an attribute value of the recovery point for the second tuples to be generated; and wherein the recovery point management section determines the recovery point for the system by conducting a search on attribute values of the tuple recovery points for all units of the query execution section to locate the oldest recovery point.

* * * * *